United States Patent
Liao et al.

(10) Patent No.: US 9,557,535 B1
(45) Date of Patent: Jan. 31, 2017

(54) PHOTOGRAPHING OPTICAL SYSTEM, IMAGE CAPTURING DEVICE AND ELECTRONIC DEVICE

(71) Applicant: LARGAN PRECISION CO., LTD., Taichung (TW)

(72) Inventors: Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/882,650

(22) Filed: Oct. 14, 2015

(30) Foreign Application Priority Data

Sep. 11, 2015 (TW) .............................. 104130137 A

(51) Int. Cl.
   *G02B 3/02* (2006.01)
   *G02B 13/18* (2006.01)
   *G02B 9/60* (2006.01)
   *G02B 13/00* (2006.01)

(52) U.S. Cl.
   CPC .............. *G02B 13/0045* (2013.01); *G02B 9/60* (2013.01)

(58) Field of Classification Search
   CPC ..... G02B 13/0045; G02B 9/60; G02B 13/002; G02B 3/02
   USPC .................................. 359/714, 753, 763, 764
   See application file for complete search history.

(56) References Cited

U.S. PATENT DOCUMENTS

| 7,710,665 | B2 | 5/2010 | Park et al. |
| 7,965,454 | B2 | 6/2011 | Tanaka et al. |
| 8,537,472 | B2 | 9/2013 | Tsai et al. |
| 8,687,293 | B2 | 4/2014 | Chen et al. |
| 8,780,459 | B2 | 7/2014 | Chen et al. |
| 8,810,921 | B1 | 8/2014 | Tsai et al. |
| 8,908,288 | B2 | 12/2014 | Hsu et al. |
| 9,001,438 | B2 | 4/2015 | Okano |
| 2015/0022714 | A1 | 1/2015 | Huang |
| 2015/0103225 | A1 | 4/2015 | Hsu et al. |

FOREIGN PATENT DOCUMENTS

TW    I479187 B    4/2015

*Primary Examiner* — William Choi
(74) *Attorney, Agent, or Firm* — McClure, Qualey & Rodack, LLP

(57) ABSTRACT

A photographing optical system includes, in order from an object side to an image side, a first lens element, a second lens element, a third lens element, a fourth lens element and a fifth lens element. The first lens element with positive refractive power has a convex object-side surface. The second lens element with positive refractive power has a convex object-side surface and a concave image-side surface. The third lens element with negative refractive power has a concave image-side surface. The fourth lens element has positive refractive power. The fifth lens element with negative refractive power has a concave image-side surface, wherein the image-side surface of the fifth lens element comprises at least one convex shape thereon, and two surfaces of the fifth lens element are aspheric.

27 Claims, 23 Drawing Sheets

PHOTOGRAPHING OPTICAL SYSTEM, IMAGE CAPTURING DEVICE AND ELECTRONIC DEVICE

RELATED APPLICATIONS

This application claims priority to Taiwan Application Serial Number 104130137, filed Sep. 11, 2015, which is herein incorporated by reference.

BACKGROUND

Technical Field

The present disclosure relates to a photographing optical system and an image capturing device. More particularly, the present disclosure relates to a compact photographing optical system and an image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly provides the characteristics of large field of view and compact size so as to satisfy the trend of compact electronic products. However, the fine image quality cannot be maintained due to the generated stray light thereof.

SUMMARY

According to one aspect of the present disclosure, a photographing optical system includes, in order from an object side to an image side, a first lens element, a second lens element, a third lens element, a fourth lens element and a fifth lens element. The first lens element with positive refractive power has a convex object-side surface. The second lens element with positive refractive power has a convex object-side surface and a concave image-side surface. The third lens element with negative refractive power has a concave image-side surface. The fourth lens element has positive refractive power. The fifth lens element with negative refractive power has a concave image-side surface, wherein the image-side surface of the fifth lens element comprises at least one convex shape in an off-axial region thereon, and an object-side surface and the image-side surface of the fifth lens element are aspheric. The photographing optical system has a total of five lens elements. There is an air space between every two lens elements of the first lens element, the second lens element, the third lens element, the fourth lens element and the fifth lens element that are adjacent to each other. When a central thickness of the first lens element is CT1, a central thickness of the second lens element is CT2, a central thickness of the fourth lens element is CT4, an axial distance between the first lens element and the second lens element is T12, a focal length of the photographing optical system is f, a curvature radius of the image-side surface of the third lens element is R6, an Abbe number of the second lens element is V2, and an Abbe number of the third lens element is V3, the following conditions are satisfied:

$1.0 < CT4/(CT1+T12+CT2)$;

$0.55 \leq f/R6$; and $1.0 < (V2+V3)/(V2-V3) < 3.5$.

According to another aspect of the present disclosure, an image capturing device includes the photographing optical system according to the aforementioned aspect and an image sensor, wherein the image sensor is disposed on an image surface of the photographing optical system.

According to yet another aspect of the present disclosure, an electronic device includes the image capturing device according to the aforementioned aspect.

According to further another aspect of the present disclosure, a photographing optical system includes, in order from an object side to an image side, a first lens element, a second lens element, a third lens element, a fourth lens element and a fifth lens element. The first lens element with positive refractive power has a convex object-side surface and a convex image-side surface. The second lens element with positive refractive power has a convex object-side surface and a concave image-side surface. The third lens element has negative refractive power. The fourth lens element has a convex image-side surface. The fifth lens element with negative refractive power has a concave image-side surface, wherein the image-side surface of the fifth lens element comprises at least one convex shape in an off-axial region thereon, and an object-side surface and the image-side surface of the fifth lens element are aspheric. The photographing optical system has a total of five lens elements. There is an air space between every two lens elements of the first lens element, the second lens element, the third lens element, the fourth lens element and the fifth lens element that are adjacent to each other. When a focal length of the photographing optical system is f, a curvature radius of the object-side surface of the second lens element is R3, an Abbe number of the second lens element is V2, and an Abbe number of the third lens element is V3, the following conditions are satisfied:

$0 < R3/f < 2.5$; and $1.0 < (V2+V3)/(V2-V3) < 3.5$.

According to another aspect of the present disclosure, an image capturing device includes the photographing optical system according to the aforementioned aspect and an image sensor, wherein the image sensor is disposed on an image surface of the photographing optical system.

According to yet another aspect of the present disclosure, an electronic device includes the image capturing device according to the aforementioned aspect.

DETAILED DESCRIPTION

Figure 1:
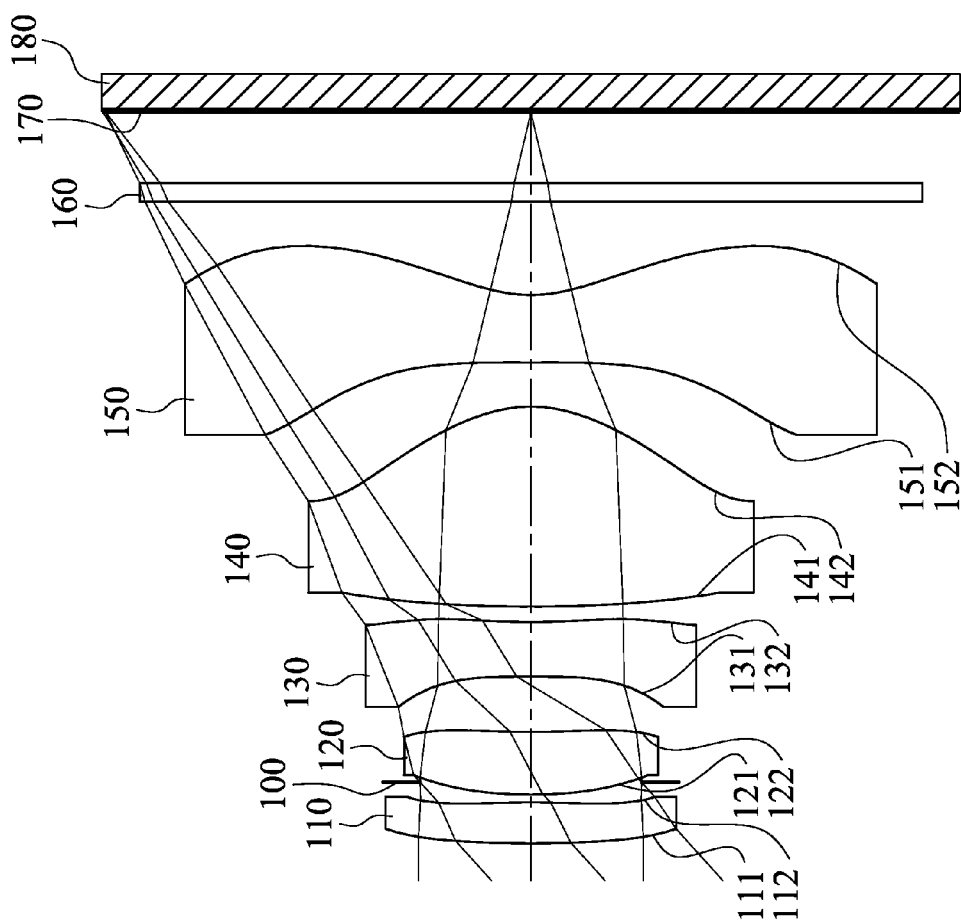
FIG. 1 is a schematic view of an image capturing device according to the 1st embodiment of the present disclosure.

A photographing optical system includes, in order from an object side to an image side, a first lens element, a second lens element, a third lens element, a fourth lens element and a fifth lens element, wherein the photographing optical system has a total of five lens elements.

According to the photographing optical system of the present disclosure, there is an air space between every two lens elements of the first lens element, the second lens element, the third lens element, the fourth lens element and the fifth lens element that are adjacent to each other. That is, each of the first through fifth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element and the fifth lens element of the photographing optical system, there is a space in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacement and it is thereby not favorable for image quality of the photographing optical system. Therefore, according to the photographing optical system of the present disclosure, an air space in a paraxial region between every two of the first lens element, the second lens element, the third lens element, the fourth lens element and the fifth lens element that are adjacent to each other of the present disclosure avoids the problem generated by the cemented lens elements.

The first lens element with positive refractive power has a convex object-side surface and can have a convex image-side surface, wherein the image-side surface of the first lens element can include at least one concave shape in an off-axial region thereof. Therefore, the total track length of the photographing optical system can be reduced effectively and larger field of view can be obtained, so that the demands of compact size and large field of view can be both satisfied, and the off-axial aberrations can be also reduced.

The second lens element with positive refractive power has a convex object-side surface and a concave image-side surface. Therefore, it is favorable for decreasing the curvature in the off-axial region of the image-side surface of the second lens element by the shape configuration of the first lens element and the second lens element, so that excessive curvature in the off-axial region of the image-side surface of the second lens element can be avoided for reducing the stray light and enhancing imaging quality.

The third lens element with negative refractive power can have a concave image-side surface, wherein the image-side surface of the third lens element can include at least one convex shape in an off-axial region thereof. Therefore, it is favorable for enhancing peripheral imaging quality by correcting aberrations generated from the first lens element and the second lens element, controlling astigmatism of the photographing optical system effectively, and further correcting the off-axial aberration thereof.

The fourth lens element can have positive refractive power, and can have a convex object-side surface and a convex image-side surface, wherein the image-side surface of the fourth lens element can include at least one concave surface in an off-axial region thereof. Therefore, it is favorable for enhancing peripheral imaging quality by reducing the sensitivity of the photographing optical system and spherical aberration, and correcting the off-axial aberration thereof.

The fifth lens element with negative refractive power has a concave image-side surface, wherein the image-side surface of the fifth lens element includes at least one convex shape in an off-axial region thereof. Therefore, the principal point can be positioned away from the image surface of the photographing optical system so as to reduce the back focal length for keeping a compact size. Further, it is also favorable for reducing the incident angle of the off-axial field onto the image sensor so as to increase the responding efficiency of the image sensor.

When a central thickness of the first lens element is CT1, a central thickness of the second lens element is CT2, a central thickness of the fourth lens element is CT4, and an axial distance between the first lens element and the second lens element is T12, the following condition is satisfied: $0.80<CT4/(CT1+T12+CT2)$. Therefore, it is favorable for arranging the lens elements of the photographing optical system, so that the space can be utilized effectively so as to maintain the compact size as well as the stability of the imaging quality and the lens assembling. Preferably, the following condition can be satisfied: $1.0<CT4/(CT1+T12+CT2)$. More preferably, the following condition can be satisfied: $1.25<CT4/(CT1+T12+CT2)<3.0$.

When a focal length of the photographing optical system is f, and a curvature radius of the image-side surface of the third lens element is R6, the following condition is satisfied: $0.55<f/R6$. Therefore, the curvature of the image-side surface of the third lens element is desirable for obtaining the proper negative refractive power thereof, so that chromatic aberration and other aberrations generated from the first lens element and the second lens element can be corrected effectively. Preferably, the following condition can be satisfied: $0.55<f/R6<1.25$.

When an Abbe number of the second lens element is V2, and an Abbe number of the third lens element is V3, the following conditions are satisfied: $1.0<(V2+V3)/(V2-V3)<3.5$. Therefore, it is favorable for balancing chromatic aberration and astigmatism of the photographing optical system properly, and suitable materials for lens fabrications can be fully utilized.

When the focal length of the photographing optical system is f, and a curvature radius of the object-side surface of the second lens element is R3, the following conditions are satisfied: $0<R3/f<2.5$. Therefore, it is favorable for enhancing image quality by further reducing the stray light.

When a focal length of the second lens element is f2, and a curvature radius of the image-side surface of the second lens element is R4, the following condition is satisfied: $0.20<f2/R4<10.0$. Therefore, it is favorable for further reducing the stray light by decreasing the peripheral curvature of the image-side surface of the second lens element. Preferably, the following condition can be satisfied: $1.0<f2/R4<5.0$.

When an axial distance between the object-side surface of the first lens element and the image-side surface of the fifth lens element is Td, and a sum of central thicknesses of the first lens element, the second lens element, the third lens element, the fourth lens element and the fifth lens element is ΣCT, the following condition is satisfied: $1.10<Td/ΣCT<1.50$. Therefore, it is favorable for reducing the volume of the photographing optical system with effective space utilizations.

When the central thickness of the first lens element is CT1, and the central thickness of the second lens element is CT2, the following condition is satisfied: $1.0<CT2/CT1<2.5$. Therefore, it is favorable for manufacturing and molding of the lens elements.

When a curvature radius of an object-side surface of the fourth lens element is R7, and a curvature radius of an image-side surface of the fourth lens element is R8, the following condition is satisfied: $0.5<(R7+R8)/(R7-R8)<2.0$. Therefore, it is favorable for reducing the sensitivity and spherical aberration of the photographing optical system.

When a focal length of the first lens element is f1, and the focal length of the second lens element is f2, the following condition is satisfied: $1.25<f2/f1<2.5$. Therefore, it is favorable for obtaining a balanced distribution of the refractive power between the first lens element and the second lens element.

When the central thickness of the second lens element is CT2, and the axial distance between the first lens element and the second lens element is T12, the following condition is satisfied: $1.5<CT2/T12$. Therefore, it is favorable for reducing the total track length of the photographing optical system so as to maintain the compact size thereof by effectively utilizing the object side space thereof.

According to the photographing optical system of the present disclosure, the lens elements thereof can be made of glass or plastic materials. When the lens elements are made of glass materials, the distribution of the refractive power of the photographing optical system may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than spherical surface so as to have more controllable variables for eliminating aberrations thereof, and to further decrease the required amount of lens elements in the photographing optical system. Therefore, the total track length of the photographing optical system can also be reduced.

According to the photographing optical system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the photographing optical system of the present disclosure, the refractive power or the focal length of a lens element being positive or negative may refer to the refractive power or the focal length in a paraxial region of the lens element.

According to the photographing optical system of the present disclosure, the photographing optical system can include at least one stop, such as an aperture stop, a glare stop or a field stop. Said glare stop or said field stop is for eliminating the stray light and thereby improving the image resolution thereof.

According to the photographing optical system of the present disclosure, the image surface of the photographing optical system, based on the corresponding image sensor, can be flat or curved. In particular, the image surface can be a curved surface being concave facing towards the object side.

According to the photographing optical system of the present disclosure, an aperture stop can be configured as a front stop or a middle stop. A front stop disposed between an imaged object and the first lens element can provide a longer distance between an exit pupil of the photographing optical system and the image surface and thereby creates a telecentric effect, which improves the image-sensing efficiency of an image sensor. A middle stop disposed between the first lens element and the image surface is favorable for enlarging the field of view of the photographing optical system and thereby provides a wider field of view for the same.

According to the photographing optical system of the present disclosure, the photographing optical system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned photographing optical system and an image sensor, wherein the image sensor is disposed on the image side of the aforementioned photographing optical system, that is, the image sensor can be disposed on or near the image surface of the aforementioned photographing optical system. In the aforementioned photographing optical system, the characteristics of the controlled total track length and the large field of view can be both obtained by the refractive power distribution of the first lens element and the second lens element. Further, the curvature in the off-axial region of the image-side surface of the second lens element can be decreased effectively by the shape configuration of the first lens element and the second lens element, so that the stray light can be reduced and image quality can be enhanced. Preferably, the image capturing device can further include a barrel member, a holding member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-13th specific embodiments are provided for further explanation.

1st Embodiment

Figure 2:
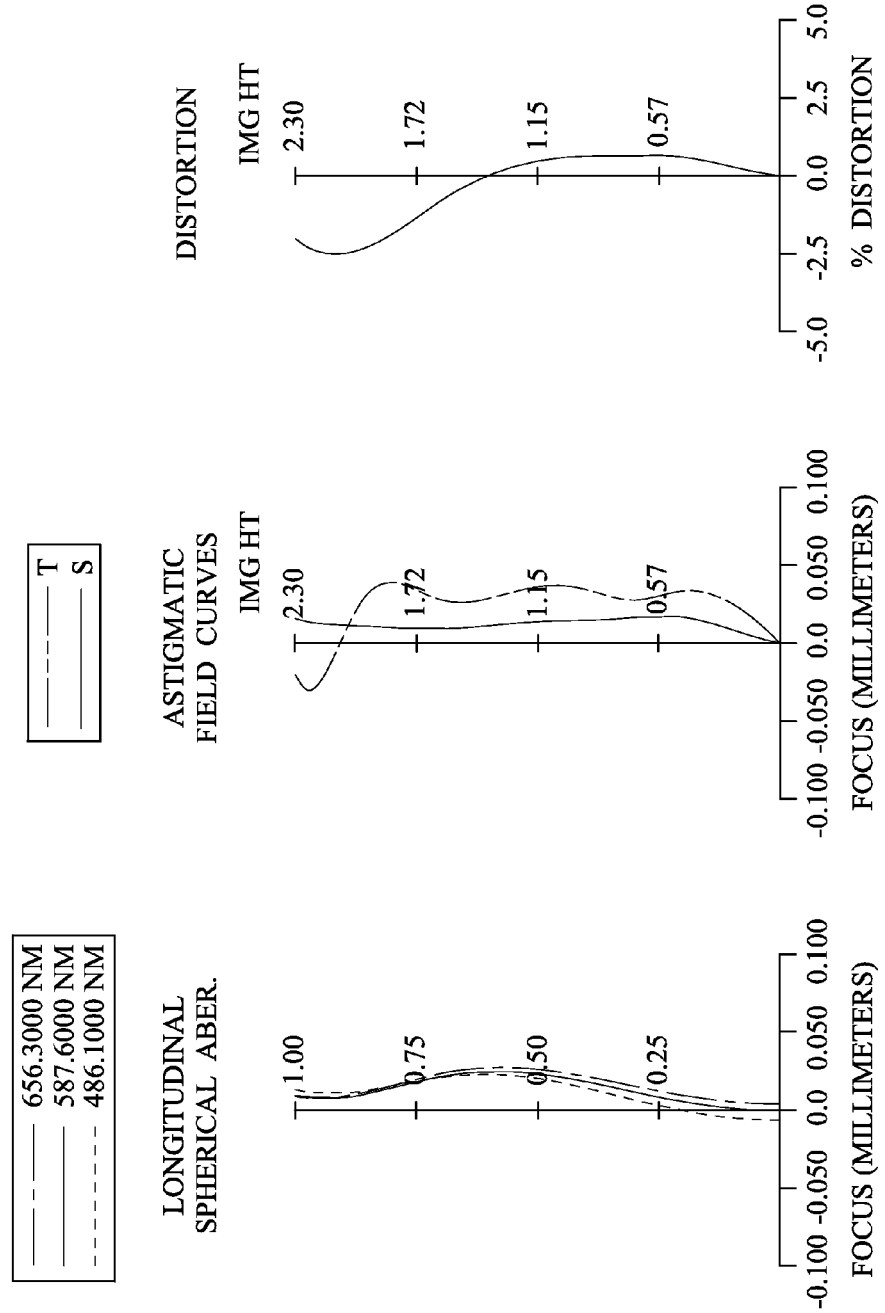
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical system (its reference numeral is omitted) and an image sensor 180. The photographing optical system includes, in order from an object side to an image side, a first lens element 110, an aperture stop 100, a second lens element 120, a third lens element 130, a fourth lens element 140, a fifth lens element 150, an IR-cut filter 160 and an image surface 170, wherein the image sensor 180 is disposed on the image surface 170 of the photographing optical system. The photographing optical system has a total of five lens elements (110-150). There is an air space in a paraxial region between every two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric. Furthermore, the image-side surface 112 of the first lens element 110 includes at least one concave shape in an off-axial region thereof.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 of the third lens element 130 includes at least one convex shape in an off-axial region thereof.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, the image-side surface 142 of the fourth lens element 140 includes at least one concave shape in an off-axial region thereof.

The fifth lens element 150 with negative refractive power has an object-side surface 151 being concave in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least one convex shape in an off-axial region thereof.

The IR-cut filter 160 is made of a glass material and located between the fifth lens element 150 and the image surface 170, and will not affect the focal length of the photographing optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical system according to the 1st embodiment, when a focal length of the photographing optical system is f, an f-number of the photographing optical system is Fno, and half of a maximal field of view of the photographing optical system is HFOV, these parameters have the following values: f=2.59 mm; Fno=2.15; and HFOV=42.0 degrees.

In the photographing optical system according to the 1st embodiment, when an Abbe number of the second lens element 120 is V2, and an Abbe number of the third lens element 130 is V3, the following condition is satisfied: (V2+V3)/(V2−V3)=2.15.

In the photographing optical system according to the 1st embodiment, when a central thickness of the first lens element 110 is CT1, and a central thickness of the second lens element 120 is CT2, the following condition is satisfied: CT2/CT1=1.54.

In the photographing optical system according to the 1st embodiment, when the central thickness of the second lens element 120 is CT2, and an axial distance between the first lens element 110 and the second lens element 120 is T12, the following condition is satisfied: CT2/T12=8.02.

In the photographing optical system according to the 1st embodiment, when the central thickness of the first lens element 110 is CT1, the central thickness of the second lens element 120 is CT2, a central thickness of the fourth lens element 140 is CT4, and the axial distance between the first lens element 110 and the second lens element 120 is T12, the following condition is satisfied: CT4/(CT1+T12+CT2)=1.80.

In the photographing optical system according to the 1st embodiment, when an axial distance between the object-side surface 111 of the first lens element 110 and the image-side surface 152 of the fifth lens element 150 is Td, the central thickness of the first lens element 110 is CT1, the central thickness of the second lens element 120 is CT2, a central thickness of the third lens element 130 is CT3, the central thickness of the fourth lens element 140 is CT4, a central thickness of the fifth lens element 150 is CT5, and a sum of central thicknesses of the first lens element 110, the second lens element 120, the third lens element 130, the fourth lens element 140 and the fifth lens element 150 is ΣCT (ΣCT=CT1+CT2+CT3+CT4+CT5), the following condition is satisfied: Td/ΣCT=1.29.

In the photographing optical system according to the 1st embodiment, when the focal length of the photographing optical system is f, and a curvature radius of the object-side surface 121 of the second lens element 120 is R3, the following condition is satisfied: R3/f=0.98.

In the photographing optical system according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.81.

In the photographing optical system according to the 1st embodiment, when the focal length of the photographing optical system is f, and a curvature radius of the image-side surface 132 of the third lens element 130 is R6, the following condition is satisfied: f/R6=0.78.

In the photographing optical system according to the 1st embodiment, when a focal length of the second lens element 120 is f2, and a curvature radius of the image-side surface 122 of the second lens element 120 is R4, the following condition is satisfied: f2/R4=1.78.

In the photographing optical system according to the 1st embodiment, when a focal length of the first lens element 110 is f1, and the focal length of the second lens element 120 is f2, the following condition is satisfied: f2/f1=1.48.

The detailed optical data of the 1st embodiment are shown in Table 1 and the aspheric surface data are shown in Table 2 below.

TABLE 1

1st Embodiment
f = 2.59 mm, Fno = 2.15, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.237 | ASP | 0.219 | Plastic | 1.544 | 55.9 | 6.04 |
| 2 | | −6.861 | ASP | 0.108 | | | | |
| 3 | Ape. Stop | Plano | | −0.066 | | | | |
| 4 | Lens 2 | 2.526 | ASP | 0.337 | Plastic | 1.544 | 55.9 | 8.93 |
| 5 | | 5.013 | ASP | 0.296 | | | | |
| 6 | Lens 3 | −12.949 | ASP | 0.293 | Plastic | 1.661 | 20.4 | −3.96 |
| 7 | | 3.312 | ASP | 0.082 | | | | |
| 8 | Lens 4 | 6.808 | ASP | 1.074 | Plastic | 1.544 | 55.9 | 1.26 |
| 9 | | −0.719 | ASP | 0.236 | | | | |
| 10 | Lens 5 | −82.424 | ASP | 0.362 | Plastic | 1.535 | 55.7 | −1.38 |
| 11 | | 0.744 | ASP | 0.500 | | | | |
| 12 | IR-cut filter | Plano | | 0.100 | Glass | 1.517 | 64.2 | — |
| 13 | | Plano | | 0.388 | | | | |
| 14 | Image | Plano | | — | | | | |

Reference wavelength is 587.6 nm (d-line).

TABLE 2

Aspheric Coefficients

| | Surface # | | | | |
|---|---|---|---|---|---|
| | 1 | 2 | 4 | 5 | 6 |
| k = | −8.4755E+00 | −6.7452E+01 | −2.2326E+01 | −8.7934E+00 | −9.0000E+01 |
| A4 = | −4.1211E−02 | 1.7877E−01 | 3.3655E−01 | −3.0379E−01 | −6.7088E−01 |
| A6 = | 2.2556E−01 | 5.1300E−01 | 1.1905E−01 | 1.9955E−01 | 5.8627E−01 |

TABLE 2-continued

| Aspheric Coefficients | | | | | |
|---|---|---|---|---|---|
| A8 = | 3.2147E−01 | −1.3209E+00 | −1.5355E+00 | −1.0378E+00 | −1.9334E+00 |
| A10 = | −1.4588E+00 | 2.1531E+00 | 3.1056E+00 | 1.4617E+00 | 2.8902E+00 |
| A12 = | 2.1388E+00 | −8.7316E−01 | −2.4524E+00 | −1.0373E+00 | −1.0826E+00 |
| A14 = | −1.1471E+00 | 5.1145E−02 | | | |

| | Surface # | | | | |
|---|---|---|---|---|---|
| | 7 | 8 | 9 | 10 | 11 |
| k = | −9.0000E+01 | 1.2827E+01 | −4.0309E+00 | −3.4022E+01 | −5.0057E+00 |
| A4 = | −1.9193E−01 | −7.1742E−02 | −3.5635E−01 | −2.0525E−01 | −1.7029E−01 |
| A6 = | −1.7601E−01 | 2.2300E−01 | 6.2932E−01 | 1.3007E−02 | 1.0940E−01 |
| A8 = | 7.0522E−01 | −7.5122E−01 | −8.2726E−01 | 9.0929E−02 | −5.2125E−02 |
| A10 = | −7.7287E−01 | 1.9048E+00 | 7.4820E−01 | −7.4602E−02 | 1.4621E−02 |
| A12 = | 3.6604E−01 | −2.5684E+00 | −3.2137E−01 | 2.5136E−02 | −2.2362E−03 |
| A14 = | | 1.7185E+00 | 4.9436E−02 | −1.5826E−03 | 1.3132E−04 |
| A16 = | | −4.6184E−01 | | −5.0519E−04 | 3.7920E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the term definitions of the tables are the same as Table 1 and Table 2 of the 1st embodiment. Therefore, an explanation in this regard will not be provided again.

2nd Embodiment

Figure 3:
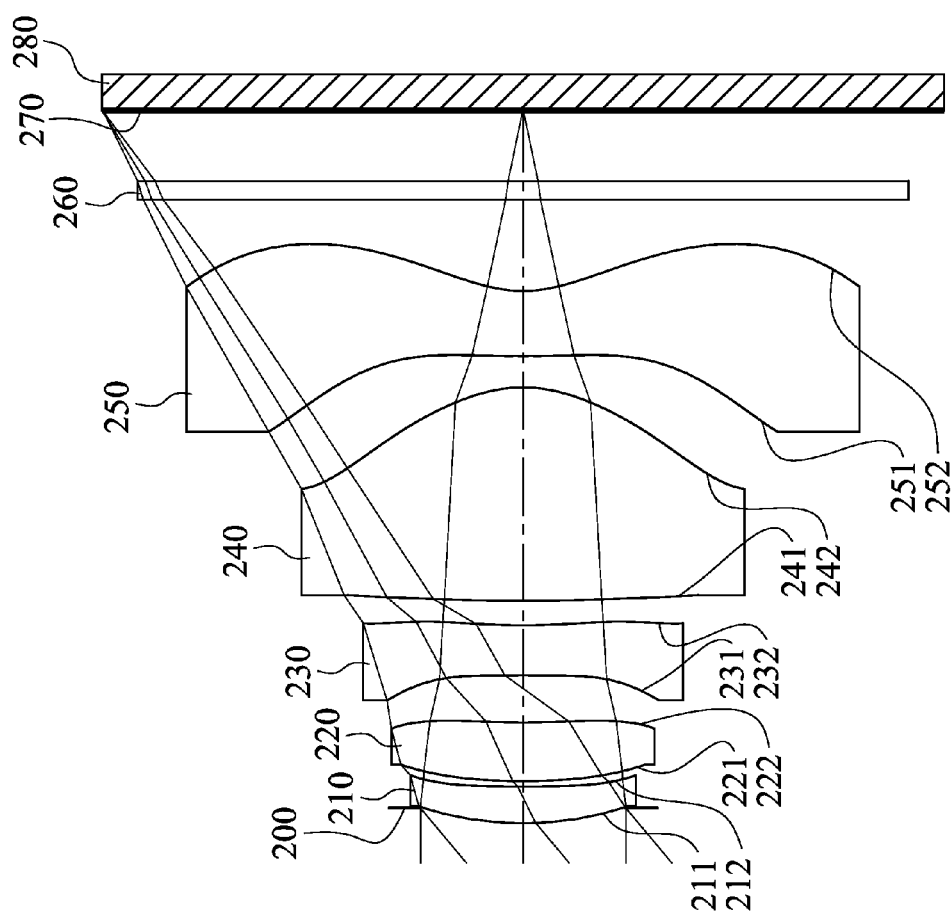
FIG. 3 is a schematic view of an image capturing device according to the 2nd embodiment of the present disclosure.
Figure 4:
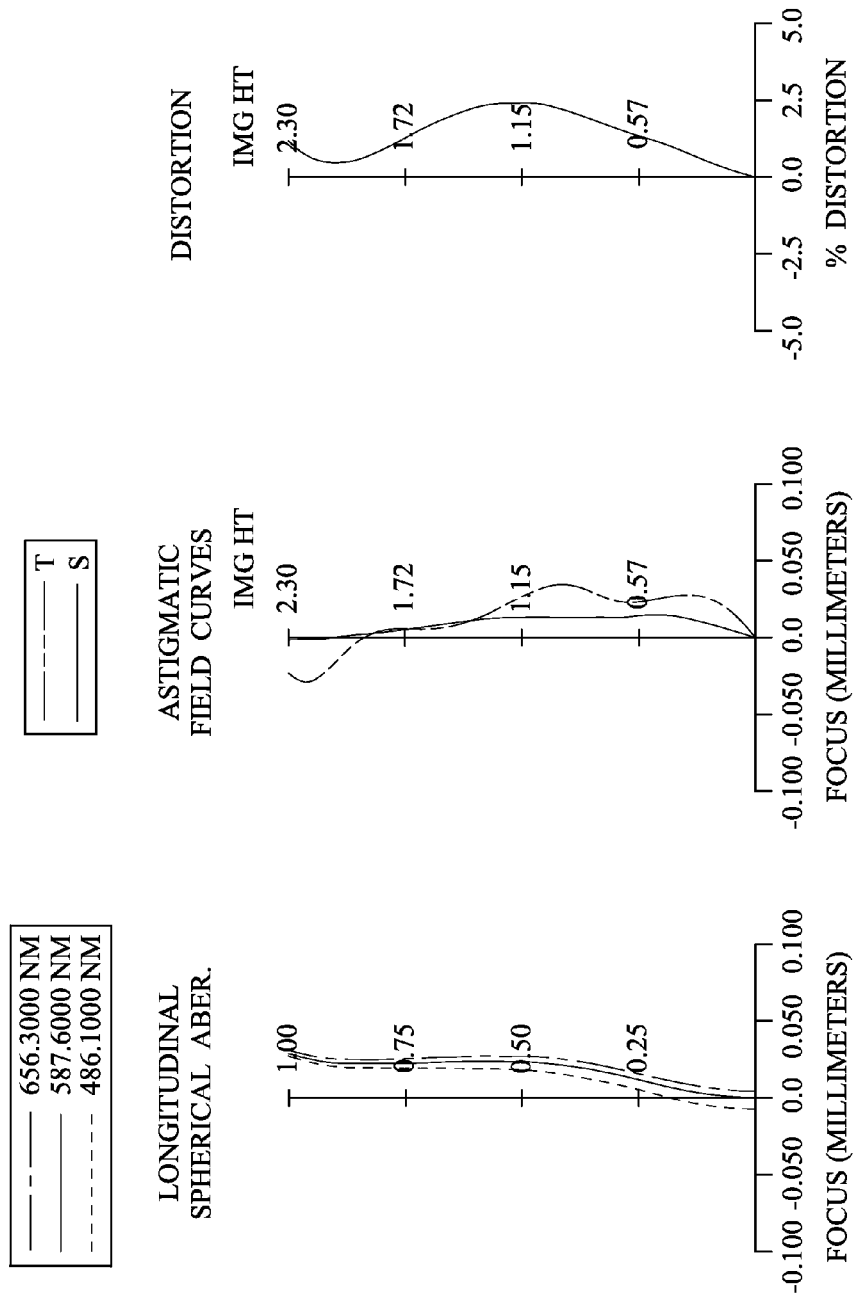
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing optical system (its reference numeral is omitted) and an image sensor 280. The photographing optical system includes, in order from an object side to an image side, an aperture stop 200, a first lens element 210, a second lens element 220, a third lens element 230, a fourth lens element 240, a fifth lens element 250, an IR-cut filter 260 and an image surface 270, wherein the image sensor 280 is disposed on the image surface 270 of the photographing optical system. The photographing optical system has a total of five lens elements (210-250). There is an air space in a paraxial region between every two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric. Furthermore, the image-side surface 212 of the first lens element 210 includes at least one concave shape in an off-axial region thereof.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the image-side surface 232 of the third lens element 230 includes at least one convex shape in an off-axial region thereof.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric. Furthermore, the image-side surface 242 of the fourth lens element 240 includes at least one concave shape in an off-axial region thereof.

The fifth lens element 250 with negative refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least one convex shape in an off-axial region thereof.

The IR-cut filter 260 is made of a glass material and located between the fifth lens element 250 and the image surface 270, and will not affect the focal length of the photographing optical system.

The detailed optical data of the 2nd embodiment are shown in Table 3 and the aspheric surface data are shown in Table 4 below.

TABLE 3

2nd Embodiment
f = 2.69 mm, Fno = 2.40, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.083 | | | | |
| 2 | Lens 1 | 1.859 | ASP | 0.200 | Plastic | 1.500 | 65.0 | 4.50 |
| 3 | | 10.354 | ASP | 0.030 | | | | |
| 4 | Lens 2 | 3.590 | ASP | 0.321 | Plastic | 1.600 | 50.0 | 15.25 |
| 5 | | 5.709 | ASP | 0.256 | | | | |
| 6 | Lens 3 | 29.956 | ASP | 0.273 | Plastic | 1.661 | 20.4 | −5.12 |
| 7 | | 3.031 | ASP | 0.135 | | | | |
| 8 | Lens 4 | 10.173 | ASP | 1.165 | Plastic | 1.535 | 55.7 | 1.34 |
| 9 | | −0.742 | ASP | 0.169 | | | | |
| 10 | Lens 5 | 5.189 | ASP | 0.357 | Plastic | 1.600 | 50.0 | −1.37 |
| 11 | | 0.693 | ASP | 0.500 | | | | |
| 12 | IR-cut filter | Plano | | 0.100 | Glass | 1.517 | 64.2 | |
| 13 | | Plano | | 0.386 | | | | |
| 14 | Image | Plano | | — | | | | |

Reference wavelength is 587.6 nm (d-line).

TABLE 4

Aspheric Coefficients

| Surface # | 2 | 3 | 4 | 5 | 6 |
|---|---|---|---|---|---|
| k = | 7.7357E−01 | 9.0000E+01 | −8.6771E+01 | 1.4260E+01 | 9.0000E+01 |
| A4 = | −1.8709E−02 | 1.6641E−01 | 2.9417E−01 | −2.6653E−01 | −6.2761E−01 |
| A6 = | 1.1871E−01 | 6.0683E−01 | 1.6088E−01 | 2.0872E−01 | 6.0949E−01 |
| A8 = | 1.3229E−01 | −1.3330E+00 | −1.4658E+00 | −1.0543E+00 | −1.9007E+00 |
| A10 = | −6.4424E−01 | 2.2676E+00 | 3.1148E+00 | 1.4280E+00 | 2.9194E+00 |
| A12 = | 1.8855E+00 | −1.5273E+00 | −2.6090E+00 | −1.0168E+00 | −1.0856E+00 |
| A14 = | −2.9917E+00 | −2.6263E−01 | | | |

| Surface # | 7 | 8 | 9 | 10 | 11 |
|---|---|---|---|---|---|
| k = | −7.2173E+01 | 5.3011E+01 | −4.6249E+00 | −3.4022E+01 | −4.5097E+00 |
| A4 = | −1.6386E−01 | −7.6893E−02 | −3.6692E−01 | −3.1952E−01 | −2.0539E−01 |
| A6 = | −1.7431E−01 | 2.0421E−01 | 6.2348E−01 | 7.3221E−02 | 1.2402E−01 |
| A8 = | 7.0282E−01 | −7.4442E−01 | −8.4246E−01 | 1.4755E−02 | −5.3990E−02 |
| A10 = | −7.6482E−01 | 1.9021E+00 | 7.4343E−01 | 4.4243E−02 | 1.4370E−02 |
| A12 = | 3.8325E−01 | −2.5691E+00 | −3.2008E−01 | −6.3512E−02 | −2.1955E−03 |
| A14 = | | 1.7187E+00 | 5.2697E−02 | 2.8568E−02 | 1.4278E−04 |
| A16 = | | −4.6423E−01 | | −4.3387E−03 | 2.1519E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.69 | Td/ΣCT | 1.25 |
| Fno | 2.40 | R3/f | 1.33 |
| HFOV [deg.] | 40.0 | (R7 + R8)/(R7 − R8) | 0.86 |
| (V2 + V3)/(V2 − V3) | 2.38 | f/R6 | 0.89 |
| CT2/CT1 | 1.61 | f2/R4 | 2.67 |
| CT2/T12 | 10.70 | f2/f1 | 3.39 |
| CT4/(CT1 + T12 + CT2) | 2.11 | | |

3rd Embodiment

Figure 5:
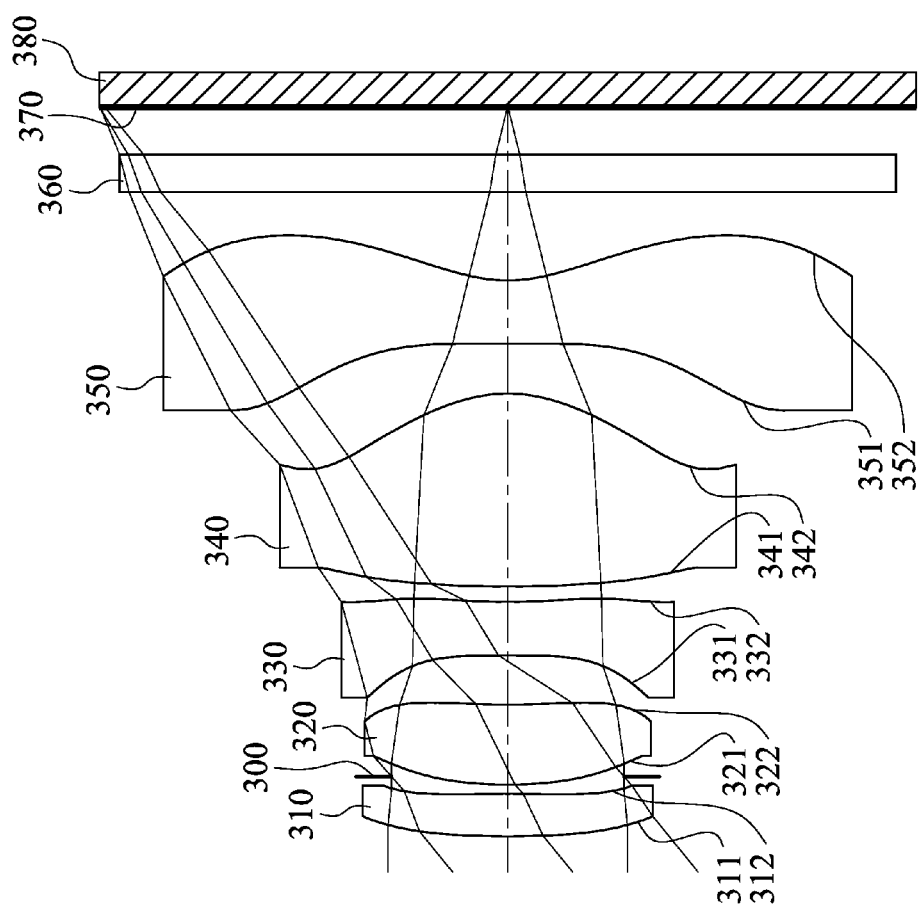
FIG. 5 is a schematic view of an image capturing device according to the 3rd embodiment of the present disclosure.
Figure 6:
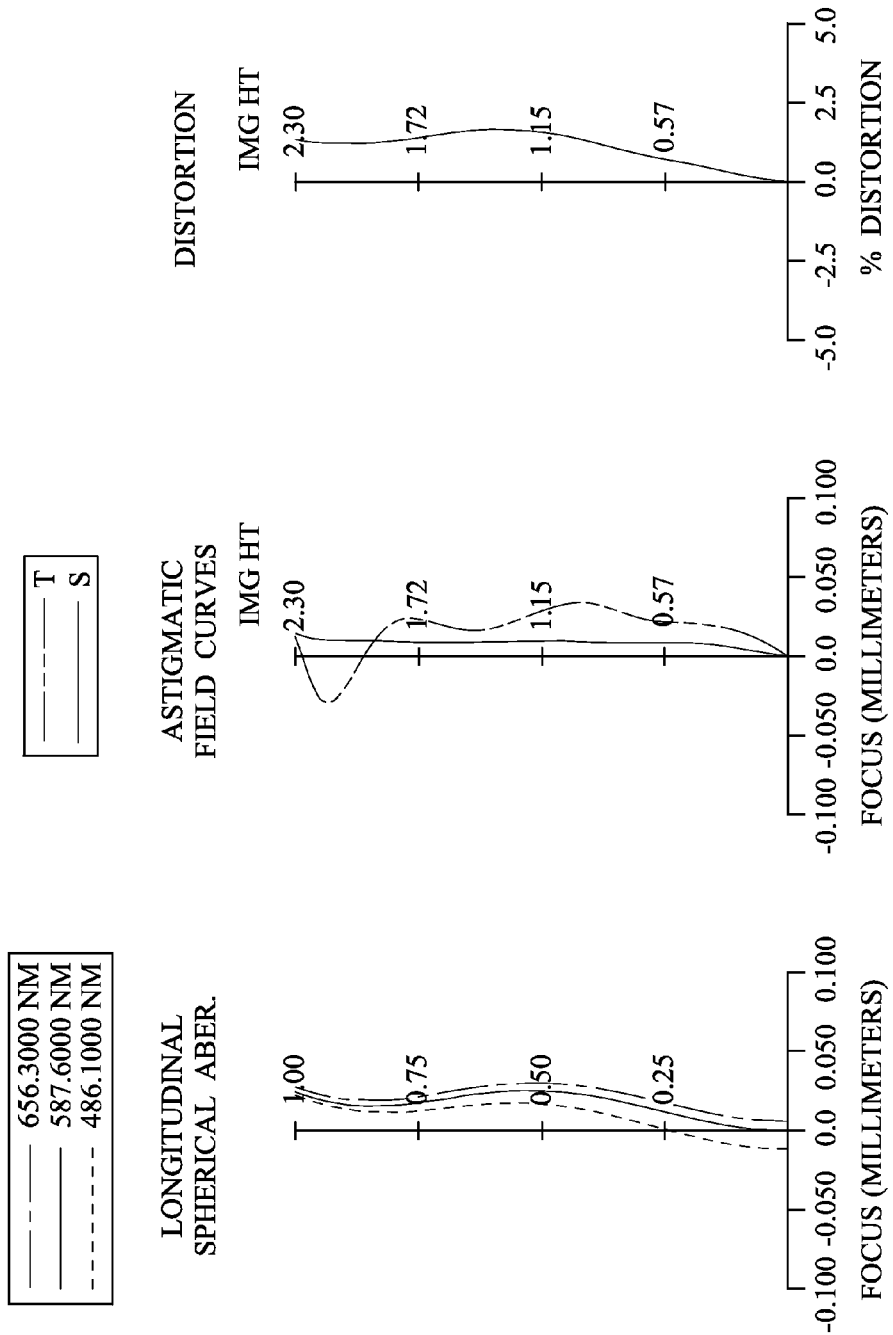
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a photographing optical system (its reference numeral is omitted) and an image sensor 380. The photographing optical system includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the image sensor 380 is disposed on the image surface 370 of the photographing optical system. The photographing optical system has a total of five lens elements (310-350). There is an air space in a paraxial region between every two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric. Furthermore, the image-side surface 312 of the first lens element 310 includes at least one concave shape in an off-axial region thereof.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of a plastic material, and has the object-side surface 331 and the image-side surface 332 being both aspheric. Furthermore, the image-side surface 332 of the third lens element 330 includes at least one convex shape in an off-axial region thereof.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric. Furthermore, the image-side surface 342 of the fourth lens element 340 includes at least one concave shape in an off-axial region thereof.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one convex shape in an off-axial region thereof.

The IR-cut filter 360 is made of a glass material and located between the fifth lens element 350 and the image surface 370, and will not affect the focal length of the photographing optical system.

The detailed optical data of the 3rd embodiment are shown in Table 5 and the aspheric surface data are shown in Table 6 below.

TABLE 5

3rd Embodiment
f = 2.76 mm, Fno = 2.05, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.537 | ASP | 0.240 | Plastic | 1.544 | 55.9 | 5.94 |
| 2 | | −11.005 | ASP | 0.098 | | | | |
| 3 | Ape. Stop | Plano | | −0.046 | | | | |
| 4 | Lens 2 | 2.419 | ASP | 0.451 | Plastic | 1.544 | 55.9 | 9.17 |
| 5 | | 4.386 | ASP | 0.278 | | | | |
| 6 | Lens 3 | −17.632 | ASP | 0.301 | Plastic | 1.639 | 23.5 | −4.02 |
| 7 | | 3.025 | ASP | 0.086 | | | | |
| 8 | Lens 4 | 6.083 | ASP | 1.089 | Plastic | 1.544 | 55.9 | 1.41 |
| 9 | | −0.821 | ASP | 0.282 | | | | |
| 10 | Lens 5 | 44.829 | ASP | 0.355 | Plastic | 1.544 | 55.9 | −1.55 |
| 11 | | 0.826 | ASP | 0.500 | | | | |
| 12 | IR-cut filter | Plano | | 0.210 | Glass | 1.517 | 64.2 | — |
| 13 | | Plano | | 0.267 | | | | |
| 14 | Image | Plano | | — | | | | |

Reference wavelength is 587.6 nm (d-line).

TABLE 6

Aspheric Coefficients

| Surface # | 1 | 2 | 4 | 5 | 6 |
|---|---|---|---|---|---|
| k = | 6.1862E+00 | −8.3984E+01 | −2.2419E+01 | −2.1326E+00 | −1.2459E+01 |
| A4 = | −3.0154E−02 | 1.7649E−01 | 3.3718E−01 | −2.9827E−01 | −6.8439E−01 |
| A6 = | 2.1252E−01 | 4.8686E−01 | 1.2687E−01 | 1.9651E−01 | 5.6813E−01 |
| A8 = | 2.4079E−01 | −1.2494E+00 | −1.5094E+00 | −1.0484E+00 | −1.9559E+00 |
| A10 = | −1.3773E+00 | 1.8173E+00 | 3.0783E+00 | 1.4575E+00 | 2.8630E+00 |
| A12 = | 2.1388E+00 | −8.7316E−01 | −2.4450E+00 | −1.0370E+00 | −1.0905E+00 |
| A14 = | −1.1471E+00 | 5.1145E−02 | | | |

| Surface # | 7 | 8 | 9 | 10 | 11 |
|---|---|---|---|---|---|
| k = | −6.7666E+01 | 2.6595E+01 | −4.5051E+00 | −3.4022E+01 | −4.8889E+00 |
| A4 = | −1.8669E−01 | −5.8747E−02 | −3.3126E−01 | −2.3558E−01 | −1.7051E−01 |
| A6 = | −1.7278E−01 | 2.1060E−01 | 6.2861E−01 | 4.0838E−02 | 1.0901E−01 |
| A8 = | 7.0708E−01 | −7.5742E−01 | −8.2805E−01 | 8.5739E−02 | −5.1490E−02 |
| A10 = | −7.7236E−01 | 1.9033E+00 | 7.4788E−01 | −1.0045E−01 | 1.4614E−02 |

TABLE 6-continued

| Aspheric Coefficients | | | | | |
|---|---|---|---|---|---|
| A12 = | 3.6501E−01 | −2.5682E+00 | −3.2147E−01 | 5.8485E−02 | −2.2402E−03 |
| A14 = | | 1.7195E+00 | 4.9417E−02 | −1.6547E−02 | 1.2787E−04 |
| A16 = | | −4.6052E−01 | | 1.7758E−03 | 3.1531E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.76 | Td/ΣCT | 1.29 |
| Fno | 2.05 | R3/f | 0.88 |
| HFOV [deg.] | 39.2 | (R7 + R8)/(R7 − R8) | 0.76 |
| (V2 + V3)/(V2 − V3) | 2.45 | f/R6 | 0.91 |
| CT2/CT1 | 1.88 | f2/R4 | 2.09 |
| CT2/T12 | 8.67 | f2/f1 | 1.54 |
| CT4/(CT1 + T12 + CT2) | 1.47 | | |

4th Embodiment

Figure 7:
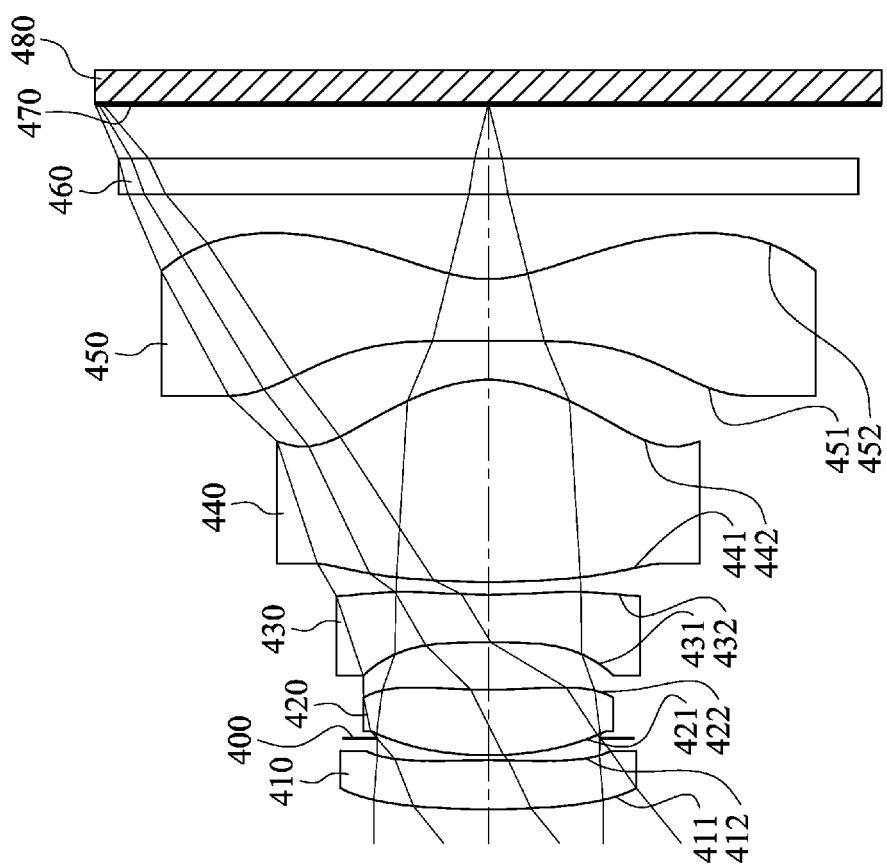
FIG. 7 is a schematic view of an image capturing device according to the 4th embodiment of the present disclosure.
Figure 8:
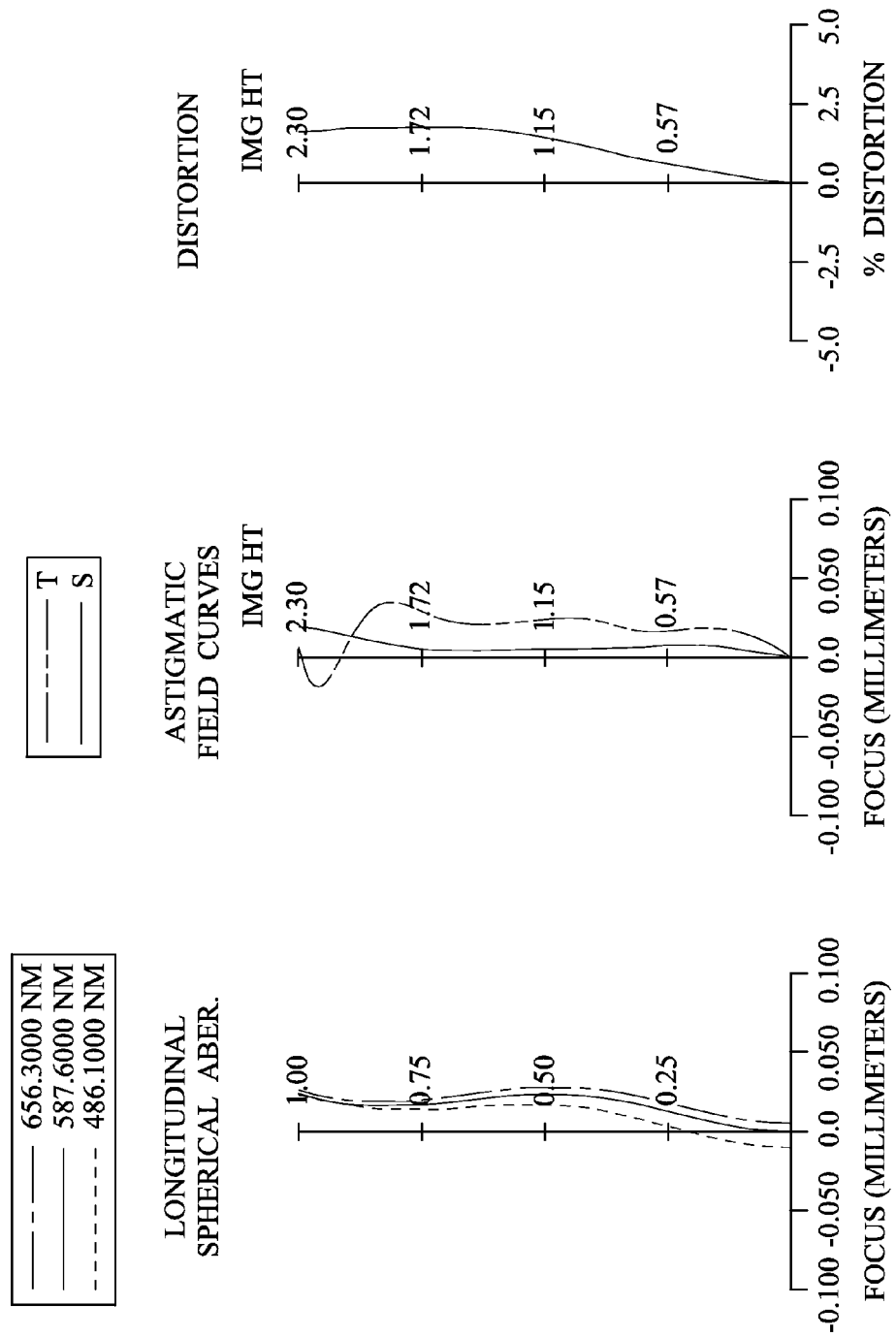
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing optical system (its reference numeral is omitted) and an image sensor 480. The photographing optical system includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the photographing optical system. The photographing optical system has a total of five lens elements (410-450). There is an air space in a paraxial region between every two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric. Furthermore, the image-side surface 412 of the first lens element 410 includes at least one concave shape in an off-axial region thereof.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes at least one convex shape in an off-axial region thereof.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric. Furthermore, the image-side surface 442 of the fourth lens element 440 includes at least one concave shape in an off-axial region thereof.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex shape in an off-axial region thereof.

The IR-cut filter 460 is made of a glass material and located between the fifth lens element 450 and the image surface 470, and will not affect the focal length of the photographing optical system.

The detailed optical data of the 4th embodiment are shown in Table 7 and the aspheric surface data are shown in Table 8 below.

TABLE 7

4th Embodiment
f = 2.77 mm, Fno = 2.05, HFOV = 39.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 5.430 ASP | 0.289 | Plastic | 1.544 | 55.9 | 6.09 |
| 2 | | −8.328 ASP | 0.130 | | | | |
| 3 | Ape. Stop | Plano | −0.100 | | | | |

TABLE 7-continued

4th Embodiment
f = 2.77 mm, Fno = 2.05, HFOV = 39.1 deg.

| Surface # | | Curvature Radius | Thickness | Material | Index | Abbe # | Focal Length |
|---|---|---|---|---|---|---|---|
| 4 | Lens 2 | 2.203 | ASP 0.386 | Plastic | 1.544 | 55.9 | 8.57 |
| 5 | | 3.918 | ASP 0.279 | | | | |
| 6 | Lens 3 | −10.828 | ASP 0.281 | Plastic | 1.639 | 23.5 | −3.87 |
| 7 | | 3.235 | ASP 0.074 | | | | |
| 8 | Lens 4 | 5.039 | ASP 1.192 | Plastic | 1.544 | 55.9 | 1.36 |
| 9 | | −0.795 | ASP 0.230 | | | | |
| 10 | Lens 5 | 24.613 | ASP 0.364 | Plastic | 1.544 | 55.9 | −1.46 |
| 11 | | 0.767 | ASP 0.500 | | | | |
| 12 | IR-cut filter | Plano | 0.210 | Glass | 1.517 | 64.2 | — |
| 13 | | Plano | 0.322 | | | | |
| 14 | Image | Plano | — | | | | |

Reference wavelength is 587.6 nm (d-line).

TABLE 8

Aspheric Coefficients

| | Surface # | | | | |
|---|---|---|---|---|---|
| | 1 | 2 | 4 | 5 | 6 |
| k = | 6.2457E+00 | −8.3983E+01 | −2.1892E+01 | −1.1312E+01 | −1.2458E+01 |
| A4 = | −6.4092E−03 | 2.3786E−01 | 4.0565E−01 | −3.1235E−01 | −6.7412E−01 |
| A6 = | 1.4197E−01 | 1.9352E−01 | −2.3253E−01 | 9.4763E−01 | 4.8510E−01 |
| A8 = | 1.7108E−01 | −8.8723E−01 | −5.1548E−01 | −3.9859E−01 | −1.1822E+00 |
| A10 = | −8.1458E−01 | 2.8901E+00 | 1.6152E+00 | −7.0929E−02 | 9.9863E−01 |
| A12 = | 1.1226E+00 | −4.8815E+00 | −1.5552E+00 | 1.0598E−01 | 2.1300E−01 |
| A14 = | −5.1314E−01 | 4.0944E+00 | | | |

| | Surface # | | | | |
|---|---|---|---|---|---|
| | 7 | 8 | 9 | 10 | 11 |
| k = | −6.8642E+01 | 1.9619E+01 | −4.6478E+00 | −3.4021E+01 | −4.9897E+00 |
| A4 = | −2.5494E−01 | −6.7706E−02 | −3.2271E−01 | −2.4056E−01 | −1.6197E−01 |
| A6 = | 1.0683E−01 | 1.8297E−01 | 6.6808E−01 | 6.3696E−02 | 9.9118E−02 |
| A8 = | 3.2614E−01 | −3.4156E−01 | −9.2915E−01 | 5.8724E−02 | −4.0654E−02 |
| A10 = | −6.1982E−01 | 8.2954E−01 | 8.9581E−01 | −7.5306E−02 | 7.6499E−03 |
| A12 = | 3.7189E−01 | −1.4648E+00 | −4.1587E−01 | 4.4538E−02 | 3.4843E−04 |
| A14 = | | 1.2585E+00 | 7.0266E−02 | −1.2760E−02 | −3.9183E−04 |
| A16 = | | −4.2627E−01 | | 1.3836E−03 | 4.5509E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.77 | Td/ΣCT | 1.24 |
| Fno | 2.05 | R3/f | 0.80 |
| HFOV [deg.] | 39.1 | (R7 + R8)/(R7 − R8) | 0.73 |
| (V2 + V3)/(V2 − V3) | 2.45 | f/R6 | 0.86 |
| CT2/CT1 | 1.34 | f2/R4 | 2.19 |
| CT2/T12 | 12.87 | f2/f1 | 1.41 |
| CT4/(CT1 + T12 + CT2) | 1.69 | | |

5th Embodiment

Figure 9:
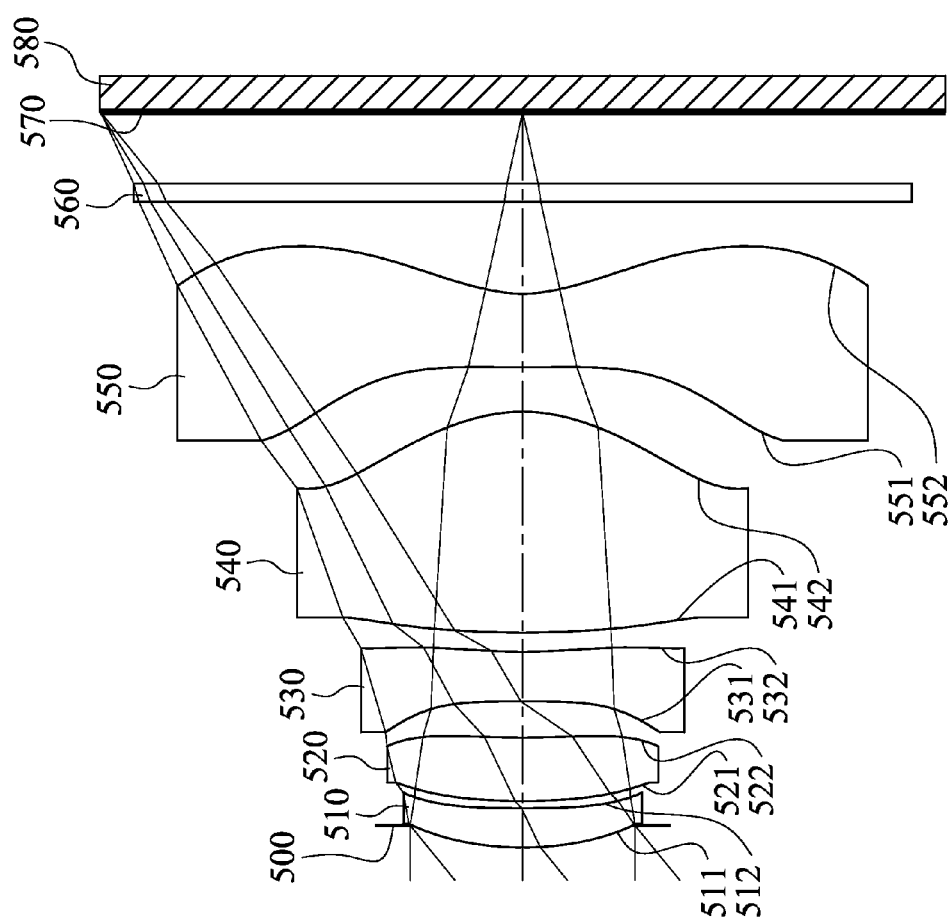
FIG. 9 is a schematic view of an image capturing device according to the 5th embodiment of the present disclosure.
Figure 10:
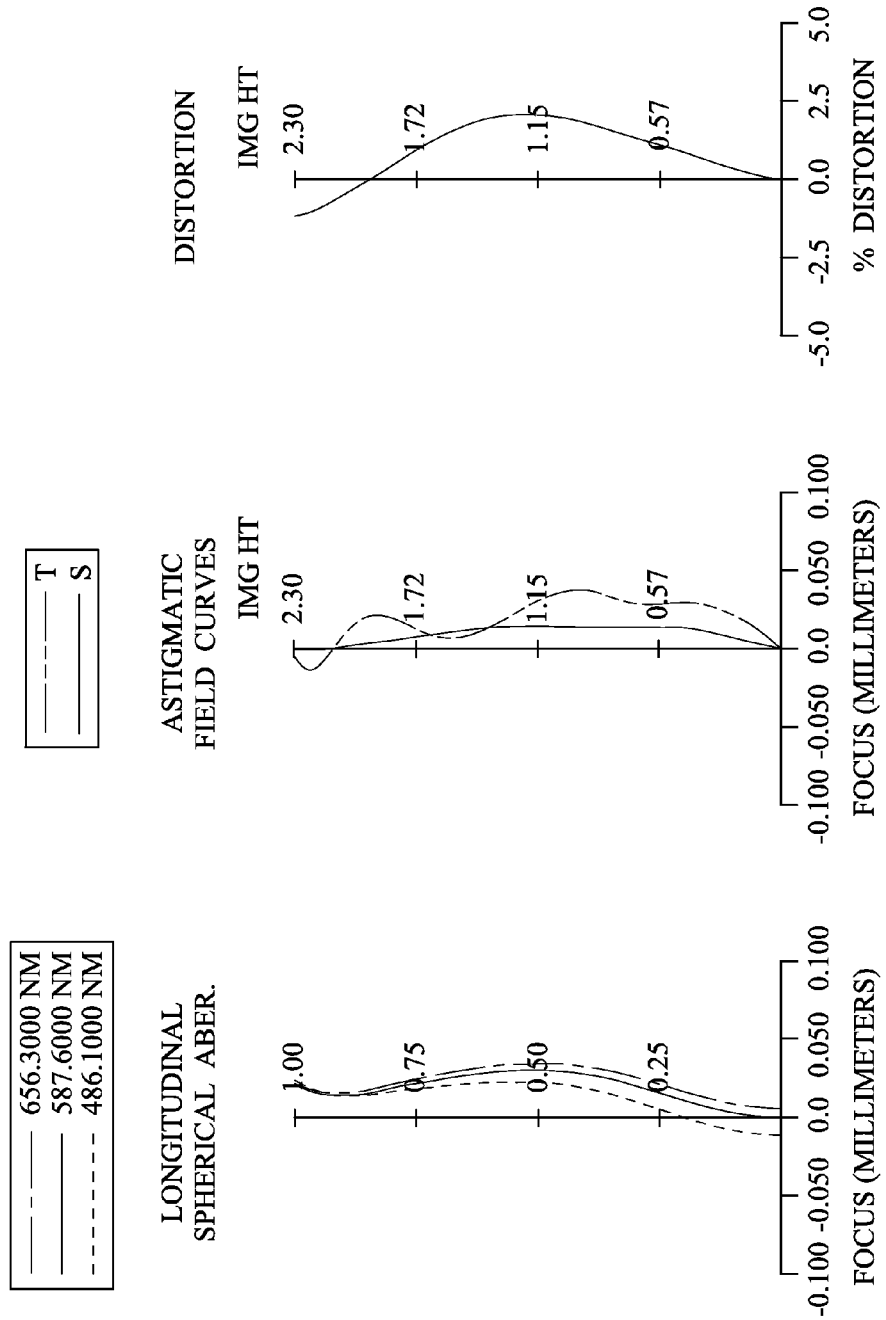
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing optical system (its reference numeral is omitted) and an image sensor 580. The photographing optical system includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the image sensor 580 is disposed on the image surface 570 of the photographing optical system. The photographing optical system has a total of five lens elements (510-550). There is an air space in a paraxial region between every two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, the image-side surface 512 of the first lens element 510 includes at least one concave shape in an off-axial region thereof.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one convex shape in an off-axial region thereof.

The fourth lens element 540 with positive refractive power has an object-side surface 541 being convex in a paraxial region thereof and an image-side surface 542 being convex in a paraxial region thereof. The fourth lens element 540 is made of a plastic material, and has the object-side surface 541 and the image-side surface 542 being both aspheric. Furthermore, the image-side surface 542 of the fourth lens element 540 includes at least one concave shape in an off-axial region thereof.

The fifth lens element 550 with negative refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least one convex shape in an off-axial region thereof.

The IR-cut filter 560 is made of a glass material and located between the fifth lens element 550 and the image surface 570, and will not affect the focal length of the photographing optical system.

The detailed optical data of the 5th embodiment are shown in Table 9 and the aspheric surface data are shown in Table 10 below.

TABLE 9

5th Embodiment
f = 2.83 mm, Fno = 2.32, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 1.699 | ASP | 0.213 | Plastic | 1.535 | 55.7 | 4.26 |
| 3 | | 6.403 | ASP | 0.040 | | | | |
| 4 | Lens 2 | 3.570 | ASP | 0.345 | Plastic | 1.535 | 55.7 | 18.83 |
| 5 | | 5.344 | ASP | 0.197 | | | | |
| 6 | Lens 3 | −24.065 | ASP | 0.270 | Plastic | 1.639 | 23.5 | −4.24 |
| 7 | | 3.063 | ASP | 0.104 | | | | |
| 8 | Lens 4 | 5.943 | ASP | 1.202 | Plastic | 1.544 | 55.9 | 1.52 |
| 9 | | −0.894 | ASP | 0.242 | | | | |
| 10 | Lens 5 | 16.311 | ASP | 0.400 | Plastic | 1.535 | 55.7 | −1.64 |
| 11 | | 0.826 | ASP | 0.500 | | | | |
| 12 | IR-cut filter | Plano | | 0.100 | Glass | 1.517 | 64.2 | — |
| 13 | | Plano | | 0.389 | | | | |
| 14 | Image | Plano | | — | | | | |

Reference wavelength is 587.6 nm (d-line).

TABLE 10

Aspheric Coefficients

| | Surface # | | | | |
|---|---|---|---|---|---|
| | 2 | 3 | 4 | 5 | 6 |
| k = | 1.2050E+00 | 3.8391E+01 | −7.5168E+01 | 5.8880E+00 | 9.0000E+01 |
| A4 = | −6.8867E−03 | 1.4110E−01 | 2.8132E−01 | −2.6860E−01 | −6.5408E−01 |
| A6 = | 1.6442E−01 | 5.7400E−01 | 1.9638E−01 | 1.2851E−01 | 5.7039E−01 |
| A8 = | −2.3950E−02 | −1.3097E+00 | −1.4467E+00 | −1.0592E+00 | −1.8900E+00 |
| A10 = | −4.9451E−01 | 2.3978E+00 | 3.0804E+00 | 1.5076E+00 | 2.9796E+00 |
| A12 = | 2.2894E+00 | −1.5652E+00 | −2.5925E+00 | −8.4189E−01 | −9.8336E−01 |
| A14 = | −2.9917E+00 | −3.9133E−01 | | | |

| | Surface # | | | | |
|---|---|---|---|---|---|
| | 7 | 8 | 9 | 10 | 11 |
| k = | −6.0751E+01 | 1.5406E+01 | −5.3994E+00 | −3.4022E+01 | −4.3646E+00 |
| A4 = | −1.3896E−01 | 3.9621E−03 | −3.4749E−01 | −2.6809E−01 | −1.8843E−01 |
| A6 = | −1.7275E−01 | 1.4988E−01 | 6.5470E−01 | −2.0497E−02 | 1.1965E−01 |

TABLE 10-continued

| Aspheric Coefficients | | | | | |
|---|---|---|---|---|---|
| A8 = | 6.8390E−01 | −7.8246E−01 | −8.4684E−01 | 2.1970E−01 | −5.5575E−02 |
| A10 = | −7.8391E−01 | 1.9214E+00 | 7.3924E−01 | −2.3079E−01 | 1.5500E−02 |
| A12 = | 3.8015E−01 | −2.5438E+00 | −3.2122E−01 | 1.2973E−01 | −2.3222E−03 |
| A14 = | | 1.7228E+00 | 5.2823E−02 | −3.6479E−02 | 1.1899E−04 |
| A16 = | | −4.8889E−01 | | 3.9732E−03 | 5.4536E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.83 | Td/ΣCT | 1.24 |
| Fno | 2.32 | R3/f | 1.26 |
| HFOV [deg.] | 39.2 | (R7 + R8)/(R7 − R8) | 0.74 |
| (V2 + V3)/(V2 − V3) | 2.46 | f/R6 | 0.92 |
| CT2/CT1 | 1.62 | f2/R4 | 3.52 |
| CT2/T12 | 8.63 | f2/f1 | 4.42 |
| CT4/(CT1 + T12 + CT2) | 2.01 | | |

6th Embodiment

Figure 11:
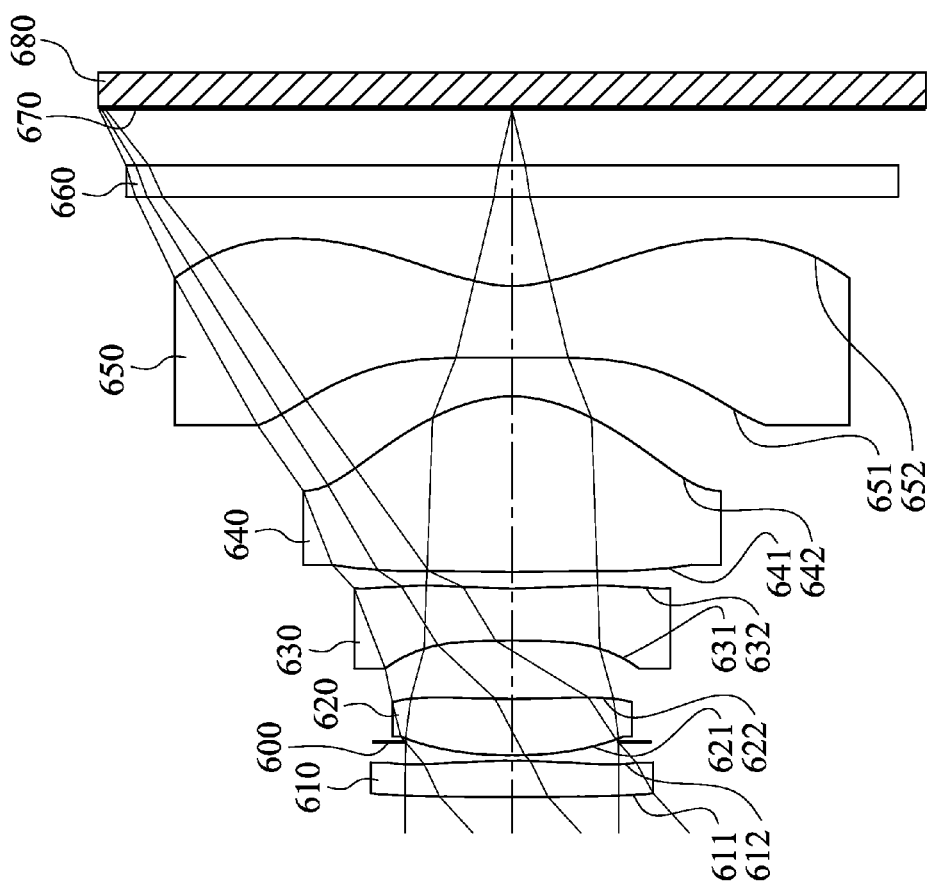
FIG. 11 is a schematic view of an image capturing device according to the 6th embodiment of the present disclosure.
Figure 12:
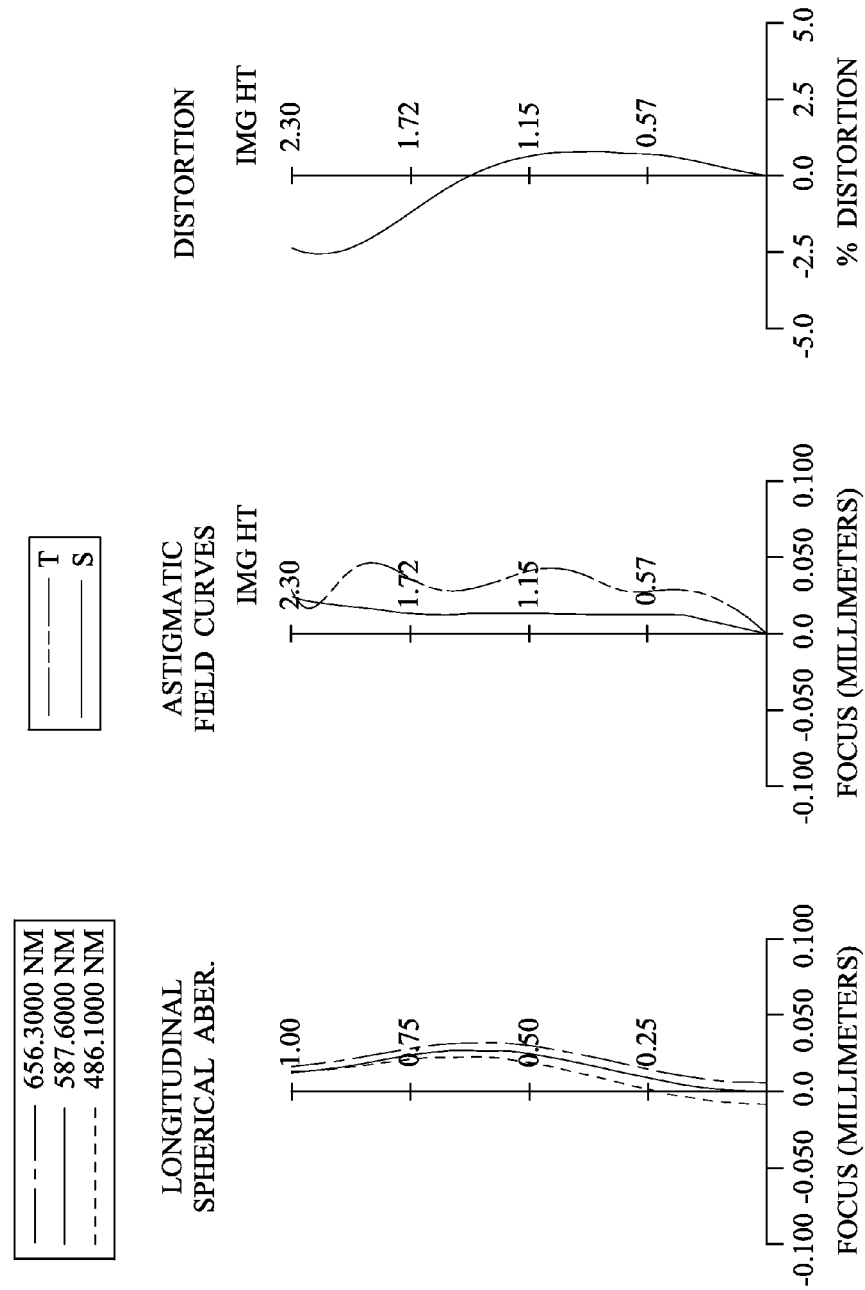
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing optical system (its reference numeral is omitted) and an image sensor 680. The photographing optical system includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the image sensor 680 is disposed on the image surface 670 of the photographing optical system. The photographing optical system has a total of five lens elements (610-650). There is an air space in a paraxial region between every two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric. Furthermore, the image-side surface 612 of the first lens element 610 includes at least one concave shape in an off-axial region thereof.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of a plastic material, and has the object-side surface 631 and the image-side surface 632 being both aspheric. Furthermore, the image-side surface 632 of the third lens element 630 includes at least one convex shape in an off-axial region thereof.

The fourth lens element 640 with positive refractive power has an object-side surface 641 being convex in a paraxial region thereof and an image-side surface 642 being convex in a paraxial region thereof. The fourth lens element 640 is made of a plastic material, and has the object-side surface 641 and the image-side surface 642 being both aspheric. Furthermore, the image-side surface 642 of the fourth lens element 640 includes at least one concave shape in an off-axial region thereof.

The fifth lens element 650 with negative refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least one convex shape in an off-axial region thereof.

The IR-cut filter 660 is made of a glass material and located between the fifth lens element 650 and the image surface 670, and will not affect the focal length of the photographing optical system.

The detailed optical data of the 6th embodiment are shown in Table 11 and the aspheric surface data are shown in Table 12 below.

TABLE 11

| 6th Embodiment | | | | | | |
|---|---|---|---|---|---|---|
| f = 2.57 mm, Fno = 2.15, HFOV = 42.3 deg. | | | | | | |
| Surface # | | Curvature Radius | Thickness | Material | Index | Abbe # | Focal Length |
| 0 | Object | Plano | Infinity | | | | |
| 1 | Lens 1 | 10.754 ASP | 0.203 | Plastic | 1.544 | 55.9 | 5.50 |
| 2 | | −4.116 ASP | 0.103 | | | | |

TABLE 11-continued

6th Embodiment
f = 2.57 mm, Fno = 2.15, HFOV = 42.3 deg.

| Surface # | | Curvature Radius | | Thickness | Material | Index | Abbe # | Focal Length |
|---|---|---|---|---|---|---|---|---|
| 3 | Ape. Stop | Plano | | −0.073 | | | | |
| 4 | Lens 2 | 2.487 | ASP | 0.316 | Plastic | 1.544 | 55.9 | 8.35 |
| 5 | | 5.247 | ASP | 0.324 | | | | |
| 6 | Lens 3 | −15.838 | ASP | 0.293 | Plastic | 1.650 | 21.4 | −4.12 |
| 7 | | 3.241 | ASP | 0.092 | | | | |
| 8 | Lens 4 | 15.811 | ASP | 0.981 | Plastic | 1.544 | 55.9 | 1.33 |
| 9 | | −0.743 | ASP | 0.217 | | | | |
| 10 | Lens 5 | 33.228 | ASP | 0.400 | Plastic | 1.530 | 55.8 | −1.50 |
| 11 | | 0.772 | ASP | 0.500 | | | | |
| 12 | IR-cut filter | Plano | | 0.175 | Glass | 1.517 | 64.2 | — |
| 13 | | Plano | | 0.320 | | | | |
| 14 | Image | Plano | | — | | | | |

Reference wavelength is 587.6 nm (d-line).

TABLE 12

Aspheric Coefficients

| | | Surface # | | | |
|---|---|---|---|---|---|
| | 1 | 2 | 4 | 5 | 6 |
| k = | −7.4180E+01 | 1.4754E+01 | −1.8938E+01 | 2.7771E+00 | −9.0000E+01 |
| A4 = | −1.6911E−01 | 1.3703E−01 | 3.4648E−01 | −3.0105E−01 | −6.6530E−01 |
| A6 = | 3.3828E−01 | 4.6707E−01 | 1.2228E−01 | 2.3386E−01 | 5.5769E−01 |
| A8 = | 1.9543E−01 | −1.1356E+00 | −1.5501E+00 | −9.8035E−01 | −1.9185E+00 |
| A10 = | −1.4282E+00 | 1.6763E+00 | 3.0540E+00 | 1.4422E+00 | 2.9846E+00 |
| A12 = | 2.1459E+00 | −8.6890E−01 | −2.6040E+00 | −1.2042E+00 | −9.7097E−01 |
| A14 = | −1.1470E+00 | 6.7149E−02 | | | |

| | | Surface # | | | |
|---|---|---|---|---|---|
| | 7 | 8 | 9 | 10 | 11 |
| k = | −9.0000E+01 | 2.2084E+01 | −4.1069E+00 | −3.4004E+01 | −4.6426E+00 |
| A4 = | −1.9033E−01 | −9.6560E−02 | −3.9081E−01 | −2.0263E−01 | −1.8063E−01 |
| A6 = | −1.6227E−01 | 2.7021E−01 | 6.3157E−01 | −1.1584E−01 | 1.1675E−01 |
| A8 = | 7.1776E−01 | −7.5795E−01 | −8.2421E−01 | 3.5911E−01 | −5.3678E−02 |
| A10 = | −7.6197E−01 | 1.8986E+00 | 7.5015E−01 | −3.3532E−01 | 1.4444E−02 |
| A12 = | 3.7421E−01 | −2.5723E+00 | −3.2047E−01 | 1.6196E−01 | −2.1685E−03 |
| A14 = | | 1.7213E+00 | 4.9706E−02 | −3.9016E−02 | 1.4289E−04 |
| A16 = | | −4.5567E−01 | | 3.6876E−03 | 1.8193E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.57 | Td/ΣCT | 1.30 |
| Fno | 2.15 | R3/f | 0.97 |
| HFOV [deg.] | 42.3 | (R7 + R8)/(R7 − R8) | 0.91 |
| (V2 + V3)/(V2 − V3) | 2.24 | f/R6 | 0.79 |
| CT2/CT1 | 1.56 | f2/R4 | 1.59 |
| CT2/T12 | 10.53 | f2/f1 | 1.52 |
| CT4/(CT1 + T12 + CT2) | 1.79 | | |

7th Embodiment

Figure 13:
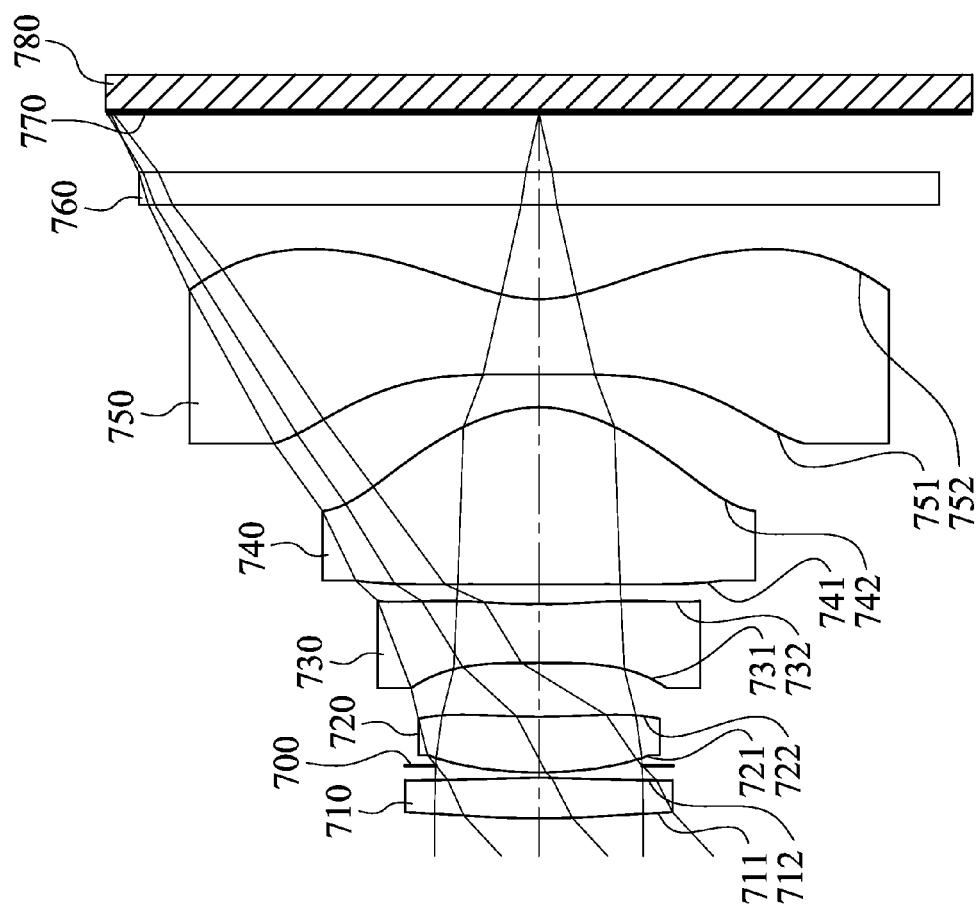
FIG. 13 is a schematic view of an image capturing device according to the 7th embodiment of the present disclosure.
Figure 14:
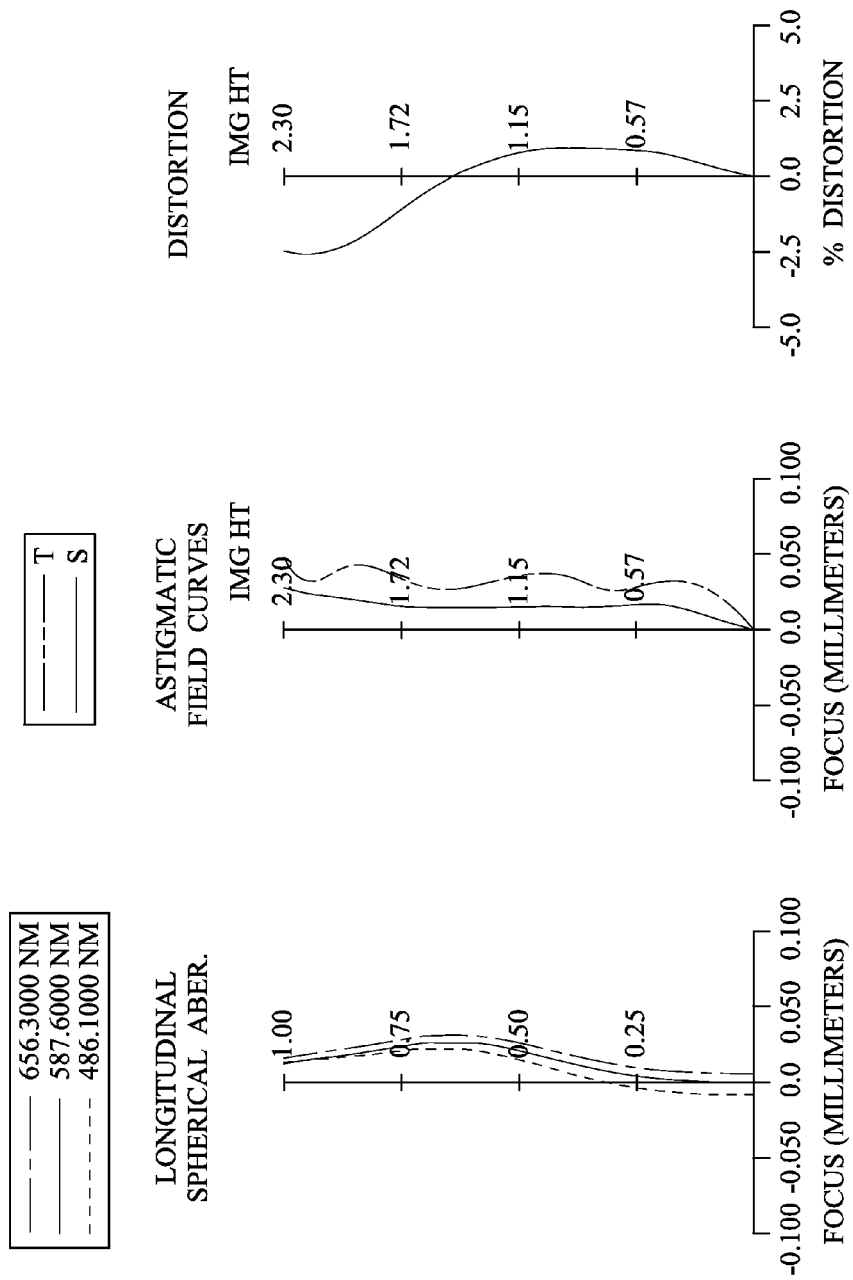
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing optical system (its reference numeral is omitted) and an image sensor 780. The photographing optical system includes, in order from an object side to an image side, a first lens element 710, an aperture stop 700, a second lens element 720, a third lens element 730, a fourth lens element 740, a fifth lens element 750, an IR-cut filter 760 and an image surface 770, wherein the image sensor 780 is disposed on the image surface 770 of the photographing optical system. The photographing optical system has a total of five lens elements (710-750). There is an air space in a paraxial region between every two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric. Furthermore, the image-side surface 712 of the first lens element 710 includes at least one concave shape in an off-axial region thereof.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of a plastic material, and has the object-side surface 731 and the image-side surface 732 being both aspheric. Furthermore, the image-side surface 732 of the third lens element 730 includes at least one convex shape in an off-axial region thereof.

The fourth lens element 740 with positive refractive power has an object-side surface 741 being convex in a paraxial region thereof and an image-side surface 742 being convex in a paraxial region thereof. The fourth lens element 740 is made of a plastic material, and has the object-side surface 741 and the image-side surface 742 being both aspheric. Furthermore, the image-side surface 742 of the fourth lens element 740 includes at least one concave shape in an off-axial region thereof.

The fifth lens element 750 with negative refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least one convex shape in an off-axial region thereof.

The IR-cut filter 760 is made of a glass material and located between the fifth lens element 750 and the image surface 770, and will not affect the focal length of the photographing optical system.

The detailed optical data of the 7th embodiment are shown in Table 13 and the aspheric surface data are shown in Table 14 below.

TABLE 13

7th Embodiment
f = 2.53 mm, Fno = 2.28, HFOV = 42.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.190 | ASP | 0.215 | Plastic | 1.544 | 55.9 | 4.72 |
| 2 | | -6.526 | ASP | 0.067 | | | | |
| 3 | Ape. Stop | Plano | | -0.037 | | | | |
| 4 | Lens 2 | 2.672 | ASP | 0.296 | Plastic | 1.544 | 55.9 | 9.94 |
| 5 | | 5.078 | ASP | 0.285 | | | | |
| 6 | Lens 3 | -19.614 | ASP | 0.312 | Plastic | 1.650 | 21.4 | -4.09 |
| 7 | | 3.093 | ASP | 0.104 | | | | |
| 8 | Lens 4 | 22.816 | ASP | 0.942 | Plastic | 1.544 | 55.9 | 1.25 |
| 9 | | -0.693 | ASP | 0.174 | | | | |
| 10 | Lens 5 | 55.141 | ASP | 0.400 | Plastic | 1.530 | 55.8 | -1.38 |
| 11 | | 0.720 | ASP | 0.500 | | | | |
| 12 | IR-cut filter | Plano | | 0.175 | Glass | 1.517 | 64.2 | — |
| 13 | | Plano | | 0.321 | | | | |
| 14 | Image | Plano | | — | | | | |

Reference wavelength is 587.6 nm (d-line).

TABLE 14

Aspheric Coefficients

| | Surface # | | | | |
|---|---|---|---|---|---|
| | 1 | 2 | 4 | 5 | 6 |
| k = | -2.9594E+00 | 3.1254E+01 | -1.6236E+01 | 5.5067E+00 | 9.0000E+01 |
| A4 = | -1.6390E-01 | 1.1979E-01 | 3.5277E-01 | -2.9452E-01 | -6.8340E-01 |
| A6 = | -1.5144E-02 | 3.7369E-01 | 1.2111E-01 | 2.1732E-01 | 5.3717E-01 |
| A8 = | 1.8933E+00 | -1.4437E+00 | -1.5779E+00 | -9.9630E-01 | -1.8929E+00 |
| A10 = | -7.8511E+00 | 5.7170E-01 | 2.9765E+00 | 1.3784E+00 | 3.0884E+00 |
| A12 = | 1.3905E+01 | 6.0264E+00 | -2.8409E+00 | -1.4463E+00 | -7.6588E-01 |
| A14 = | -9.3829E+00 | -9.2294E+00 | | | |

| | Surface # | | | | |
|---|---|---|---|---|---|
| | 7 | 8 | 9 | 10 | 11 |
| k = | -8.2173E+01 | -9.0000E+01 | -4.0561E+00 | 8.2581E+01 | -4.7800E+00 |
| A4 = | -1.8454E-01 | -1.1346E-01 | -4.1747E-01 | -1.9998E-01 | -1.8604E-01 |
| A6 = | -1.4797E-01 | 2.9356E-01 | 6.4893E-01 | -1.8870E-01 | 1.2058E-01 |

TABLE 14-continued

| Aspheric Coefficients | | | | | |
|---|---|---|---|---|---|
| A8 =  | 7.2991E−01  | −7.6184E−01 | −8.2400E−01 | 5.3273E−01  | −5.4777E−02 |
| A10 = | −7.5212E−01 | 1.8952E+00  | 7.5354E−01  | −5.1621E−01 | 1.4435E−02  |
| A12 = | 3.8183E−01  | −2.5762E+00 | −3.1779E−01 | 2.6153E−01  | −2.1358E−03 |
| A14 = |             | 1.7199E+00  | 4.4989E−02  | −6.6763E−02 | 1.4447E−04  |
| A16 = |             | −4.5558E−01 |             | 6.7397E−03  | −3.4925E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.53 | Td/ΣCT | 1.27 |
| Fno | 2.28 | R3/f | 1.06 |
| HFOV [deg.] | 42.8 | (R7 + R8)/(R7 − R8) | 0.94 |
| (V2 + V3)/(V2 − V3) | 2.24 | f/R6 | 0.82 |
| CT2/CT1 | 1.38 | f2/R4 | 1.96 |
| CT2/T12 | 9.87 | f2/f1 | 2.11 |
| CT4/(CT1 + T12 + CT2) | 1.74 | | |

8th Embodiment

Figure 15:
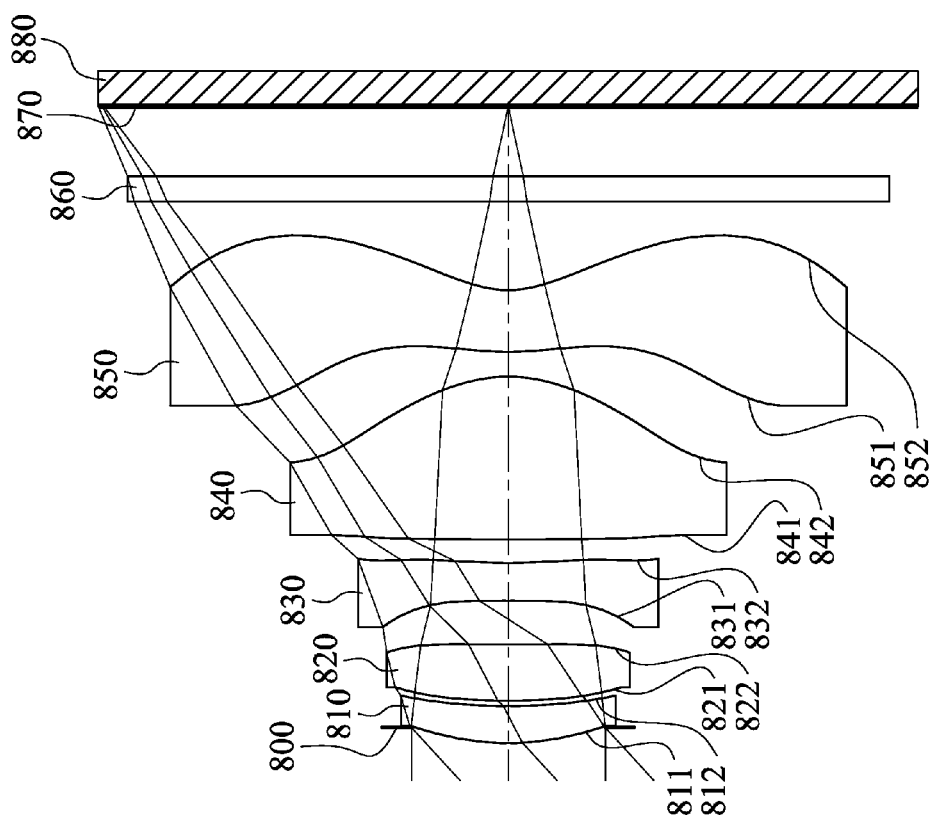
FIG. 15 is a schematic view of an image capturing device according to the 8th embodiment of the present disclosure.
Figure 16:
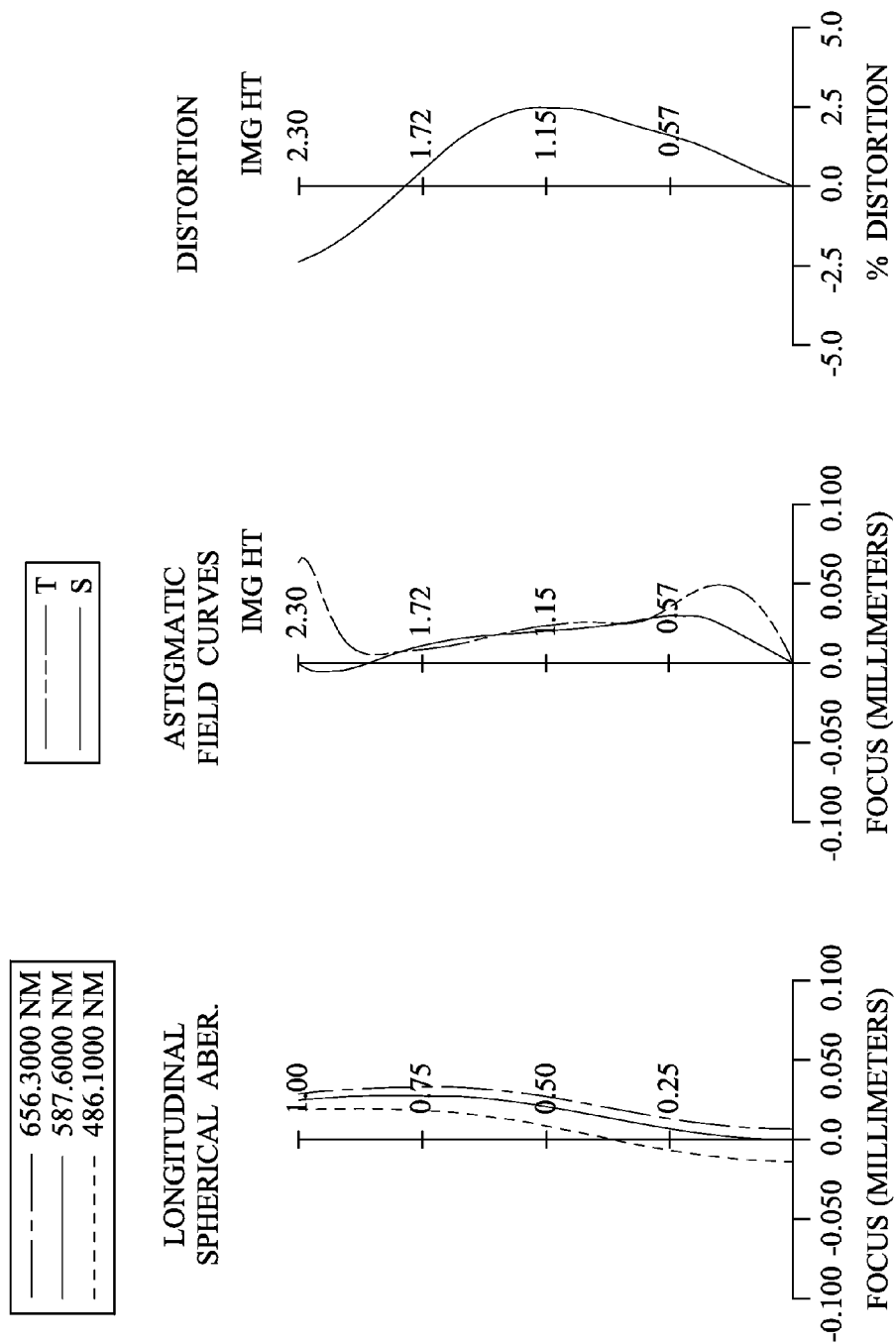
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a photographing optical system (its reference numeral is omitted) and an image sensor 880. The photographing optical system includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the image sensor 880 is disposed on the image surface 870 of the photographing optical system. The photographing optical system has a total of five lens elements (810-850). There is an air space in a paraxial region between every two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric. Furthermore, the image-side surface 812 of the first lens element 810 includes at least one concave shape in an off-axial region thereof.

The second lens element 820 with positive refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the image-side surface 832 of the third lens element 830 includes at least one convex shape in an off-axial region thereof.

The fourth lens element 840 with positive refractive power has an object-side surface 841 being convex in a paraxial region thereof and an image-side surface 842 being convex in a paraxial region thereof. The fourth lens element 840 is made of a plastic material, and has the object-side surface 841 and the image-side surface 842 being both aspheric. Furthermore, the image-side surface 842 of the fourth lens element 840 includes at least one concave shape in an off-axial region thereof.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the image-side surface 852 of the fifth lens element 850 includes at least one convex shape in an off-axial region thereof.

The IR-cut filter 860 is made of a glass material and located between the fifth lens element 850 and the image surface 870, and will not affect the focal length of the photographing optical system.

The detailed optical data of the 8th embodiment are shown in Table 15 and the aspheric surface data are shown in Table 16 below.

TABLE 15

8th Embodiment
f = 2.54 mm, Fno = 2.32, HFOV = 42.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.089 | | | | |
| 2 | Lens 1 | 1.523 ASP | 0.211 | Plastic | 1.544 | 55.9 | 4.31 |

TABLE 15-continued

8th Embodiment
f = 2.54 mm, Fno = 2.32, HFOV = 42.6 deg.

| Surface # | | Curvature Radius | Thickness | Material | Index | Abbe # | Focal Length |
|---|---|---|---|---|---|---|---|
| 3 | | 4.124 ASP | 0.030 | | | | |
| 4 | Lens 2 | 4.201 ASP | 0.318 | Plastic | 1.530 | 55.8 | 11.02 |
| 5 | | 14.597 ASP | 0.247 | | | | |
| 6 | Lens 3 | 104.123 ASP | 0.214 | Plastic | 1.633 | 23.4 | -4.69 |
| 7 | | 2.881 ASP | 0.133 | | | | |
| 8 | Lens 4 | 96.858 ASP | 0.922 | Plastic | 1.544 | 55.9 | 1.53 |
| 9 | | -0.840 ASP | 0.140 | | | | |
| 10 | Lens 5 | 1.675 ASP | 0.350 | Plastic | 1.530 | 55.8 | -1.83 |
| 11 | | 0.570 ASP | 0.500 | | | | |
| 12 | IR-cut filter | Plano | 0.145 | Glass | 1.517 | 64.2 | — |
| 13 | | Plano | 0.395 | | | | |
| 14 | Image | Plano | — | | | | |

Reference wavelength is 587.6 nm (d-line).

TABLE 16

Aspheric Coefficients

| Surface # | | | | |
|---|---|---|---|---|
| 2 | 3 | 4 | 5 | 6 |
| k = 1.6808E-01 | 4.0582E+00 | -9.0000E+01 | 9.0000E+01 | 9.0000E+01 |
| A4 = -5.2516E-02 | 8.0244E-02 | 2.5130E-01 | -2.3316E-01 | -7.4221E-01 |
| A6 = 5.0126E-02 | 4.1874E-01 | 2.4972E-01 | 1.6941E-01 | 5.0519E-01 |
| A8 = -2.4316E-01 | -1.5401E+00 | -1.4131E+00 | -1.0949E+00 | -1.3039E+00 |
| A10 = -8.3774E-01 | 2.0776E+00 | 3.0204E+00 | 1.4257E+00 | 2.5756E+00 |
| A12 = 1.6878E+00 | -2.0488E+00 | -2.8689E+00 | -8.1598E-01 | -1.7027E+00 |
| A14 = -2.9917E+00 | -1.1074E+00 | | | |

| Surface # | | | | |
|---|---|---|---|---|
| 7 | 8 | 9 | 10 | 11 |
| k = -9.0000E+01 | 6.8390E+01 | -4.7560E+00 | -3.4021E+01 | -4.1364E+00 |
| A4 = -1.7140E-01 | -1.9226E-03 | -3.6928E-01 | -3.2164E-01 | -1.9458E-01 |
| A6 = -2.7839E-01 | 2.0116E-01 | 6.4513E-01 | 1.3211E-01 | 1.1887E-01 |
| A8 = 1.1297E+00 | -8.1656E-01 | -8.3136E-01 | -4.2968E-02 | -5.5467E-02 |
| A10 = -1.1565E+00 | 1.9494E+00 | 7.4119E-01 | 2.6307E-02 | 1.5525E-02 |
| A12 = 5.2410E-01 | -2.5592E+00 | -3.2290E-01 | -6.7050E-03 | -2.3203E-03 |
| A14 = | 1.7248E+00 | 5.1085E-02 | -1.5575E-04 | 1.1855E-04 |
| A16 = | -4.7847E-01 | | 1.6476E-04 | 5.3244E-06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.54 | Td/ΣCT | 1.27 |
| Fno | 2.32 | R3/f | 1.65 |
| HFOV [deg.] | 42.6 | (R7 + R8)/(R7 - R8) | 0.98 |
| (V2 + V3)/(V2 - V3) | 2.44 | f/R6 | 0.88 |
| CT2/CT1 | 1.51 | f2/R4 | 0.75 |
| CT2/T12 | 10.60 | f2/f1 | 2.56 |
| CT4/(CT1 + T12 + CT2) | 1.65 | | |

9th Embodiment

Figure 17:
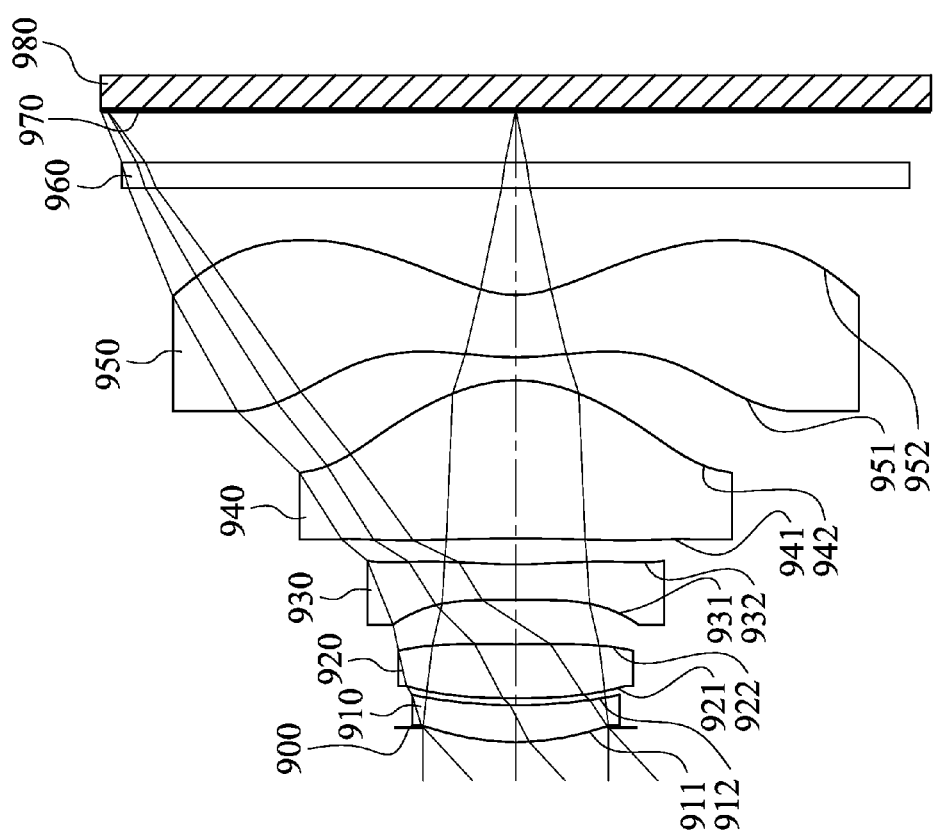
FIG. 17 is a schematic view of an image capturing device according to the 9th embodiment of the present disclosure.
Figure 18:
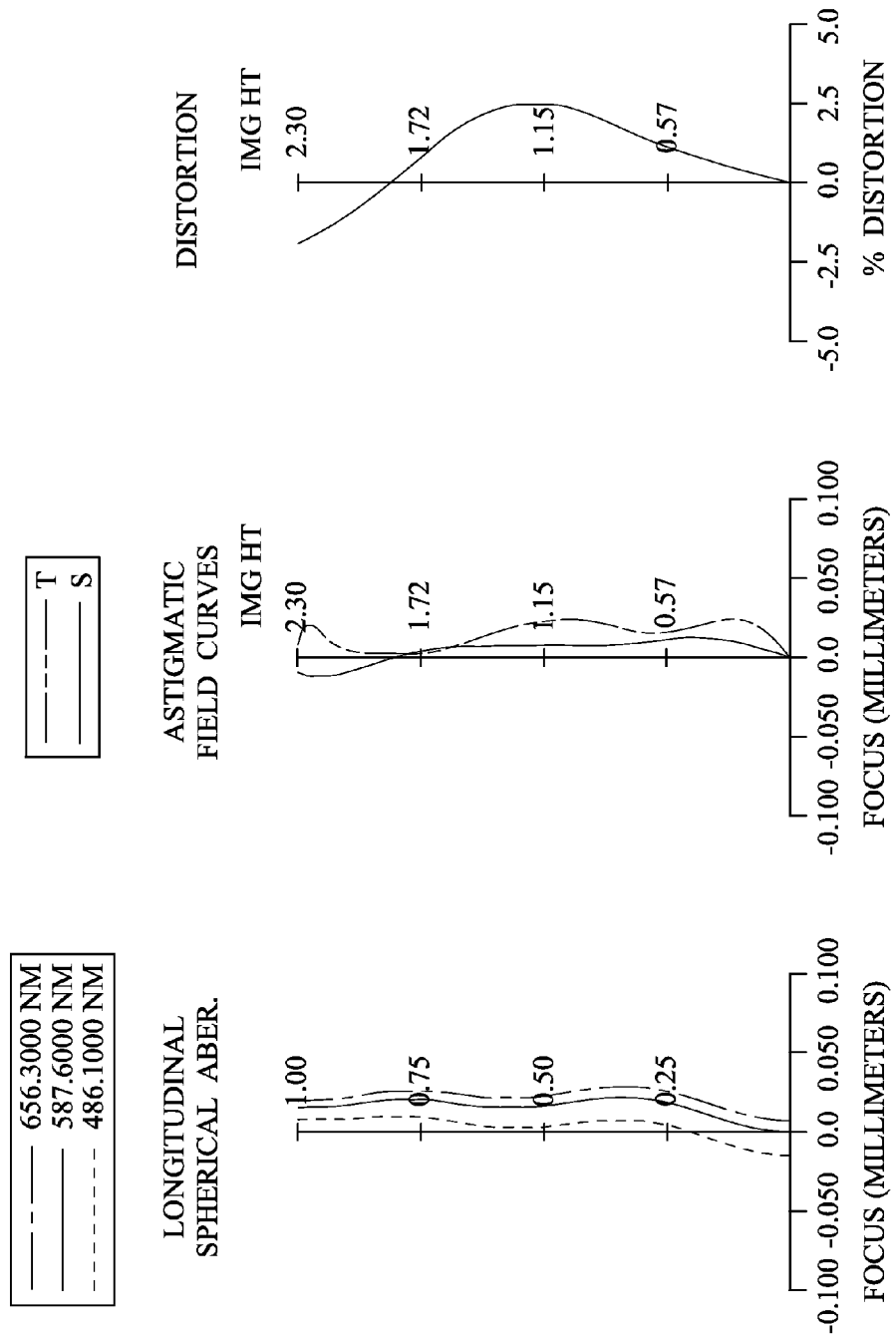
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes a photographing optical system (its reference numeral is omitted) and an image sensor 980. The photographing optical system includes, in order from an object side to an image side, an aperture stop 900, a first lens element 910, a second lens element 920, a third lens element 930, a fourth lens element 940, a fifth lens element 950, an IR-cut filter 960 and an image surface 970, wherein the image sensor 980 is disposed on the image surface 970 of the photographing optical system. The photographing optical system has a total of five lens elements (910-950). There is an air space in a paraxial region between every two of the first lens element 910, the second lens element 920, the third lens element 930, the fourth lens element 940 and the fifth lens element 950 that are adjacent to each other.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric. Furthermore, the image-side surface 912 of the first lens element 910 includes at least one concave shape in an off-axial region thereof.

The second lens element 920 with positive refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric. Furthermore, the image-side surface 932 of the third lens element 930 includes at least one convex shape in an off-axial region thereof.

The fourth lens element 940 with positive refractive power has an object-side surface 941 being concave in a paraxial region thereof and an image-side surface 942 being convex in a paraxial region thereof. The fourth lens element 940 is made of a plastic material, and has the object-side surface 941 and the image-side surface 942 being both aspheric. Furthermore, the image-side surface 942 of the fourth lens element 940 includes at least one concave shape in an off-axial region thereof.

The fifth lens element 950 with negative refractive power has an object-side surface 951 being convex in a paraxial region thereof and an image-side surface 952 being concave in a paraxial region thereof. The fifth lens element 950 is made of a plastic material, and has the object-side surface 951 and the image-side surface 952 being both aspheric. Furthermore, the image-side surface 952 of the fifth lens element 950 includes at least one convex shape in an off-axial region thereof.

The IR-cut filter 960 is made of a glass material and located between the fifth lens element 950 and the image surface 970, and will not affect the focal length of the photographing optical system.

The detailed optical data of the 9th embodiment are shown in Table 17 and the aspheric surface data are shown in Table 18 below.

TABLE 17

9th Embodiment
f = 2.53 mm, Fno = 2.43, HFOV = 42.7 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.083 |  |  |  |  |
| 2 | Lens 1 | 1.442 | ASP | 0.208 | Plastic | 1.544 | 55.9 | 4.41 |
| 3 |  | 3.426 | ASP | 0.038 |  |  |  |  |
| 4 | Lens 2 | 4.075 | ASP | 0.304 | Plastic | 1.530 | 55.8 | 8.78 |
| 5 |  | 31.927 | ASP | 0.249 |  |  |  |  |
| 6 | Lens 3 | 65.810 | ASP | 0.200 | Plastic | 1.633 | 23.4 | −4.90 |
| 7 |  | 2.960 | ASP | 0.145 |  |  |  |  |
| 8 | Lens 4 | −12.447 | ASP | 0.890 | Plastic | 1.544 | 55.9 | 1.52 |
| 9 |  | −0.797 | ASP | 0.130 |  |  |  |  |
| 10 | Lens 5 | 1.744 | ASP | 0.350 | Plastic | 1.530 | 55.8 | −1.79 |
| 11 |  | 0.572 | ASP | 0.600 |  |  |  |  |
| 12 | IR-cut filter | Plano |  | 0.145 | Glass | 1.517 | 64.2 | — |
| 13 |  | Plano |  | 0.291 |  |  |  |  |
| 14 | Image | Plano |  | — |  |  |  |  |

Reference wavelength is 587.6 nm (d-line).

TABLE 18

Aspheric Coefficients

| Surface # | 2 | 3 | 4 | 5 | 6 |
|---|---|---|---|---|---|
| k = | 2.1972E−01 | 1.8920E+00 | −9.0000E+01 | 9.0000E+01 | 9.0000E+01 |
| A4 = | −7.6792E−02 | 1.1168E−01 | 2.2638E−01 | −1.6769E−01 | −8.1843E−01 |
| A6 = | 8.3407E−01 | −4.8708E−01 | 7.4909E−01 | −1.1721E+00 | 1.3703E+00 |
| A8 = | −9.3609E+00 | 7.7743E+00 | −8.2133E+00 | 1.2419E+01 | −1.2269E+01 |
| A10 = | 4.9812E+01 | −5.1373E+01 | 5.2191E+01 | −6.8970E+01 | 6.8366E+01 |
| A12 = | −1.5289E+02 | 1.6027E+02 | −1.8458E+02 | 2.0525E+02 | −2.0383E+02 |
| A14 = | 2.3741E+02 | −2.4968E+02 | 3.3182E+02 | −3.1363E+02 | 3.1426E+02 |
| A16 = | −1.4700E+02 | 1.4664E+02 | −2.3682E+02 | 1.9313E+02 | −1.9577E+02 |

| Surface # | 7 | 8 | 9 | 10 | 11 |
|---|---|---|---|---|---|
| k = | −8.8871E+01 | −9.0000E+01 | −4.0203E+00 | −3.4020E+01 | −4.1078E+00 |
| A4 = | −2.3253E−01 | 1.5963E−02 | −3.6530E−01 | −3.2683E−01 | −1.9528E−01 |

TABLE 18-continued

| Aspheric Coefficients | | | | |
|---|---|---|---|---|
| A6 = 3.1816E−01 | 2.0249E−01 | 6.4499E−01 | 1.5594E−01 | 1.1880E−01 |
| A8 = −2.7918E+00 | −8.1794E−01 | −8.9336E−01 | −8.3492E−02 | −5.5476E−02 |
| A10 = 1.3183E+01 | 1.9470E+00 | 8.3566E−01 | 6.0841E−02 | 1.5524E−02 |
| A12 = −2.7369E+01 | −2.5618E+00 | −3.5492E−01 | −2.2181E−02 | −2.3204E−03 |
| A14 = 2.7413E+01 | 1.7227E+00 | 4.1716E−02 | 3.3277E−03 | 1.1856E−04 |
| A16 = −1.0718E+01 | −4.7921E−01 | 4.6314E−03 | −1.4578E−04 | 5.3449E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.53 | Td/ΣCT | 1.29 |
| Fno | 2.43 | R3/f | 1.61 |
| HFOV [deg.] | 42.7 | (R7 + R8)/(R7 − R8) | 1.14 |
| (V2 + V3)/(V2 − V3) | 2.44 | f/R6 | 0.85 |
| CT2/CT1 | 1.46 | f2/R4 | 0.28 |
| CT2/T12 | 8.00 | f2/f1 | 1.99 |
| CT4/(CT1 + T12 + CT2) | 1.62 | | |

10th Embodiment

Figure 19:
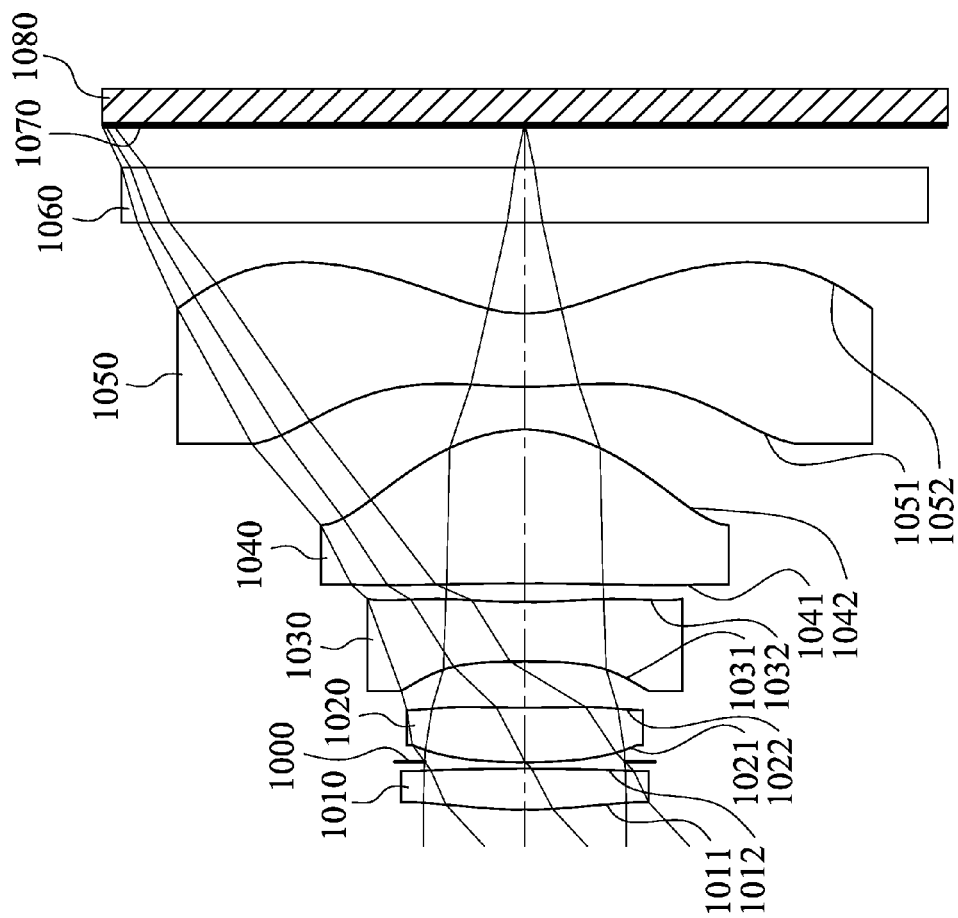
FIG. 19 is a schematic view of an image capturing device according to the 10th embodiment of the present disclosure.
Figure 20:
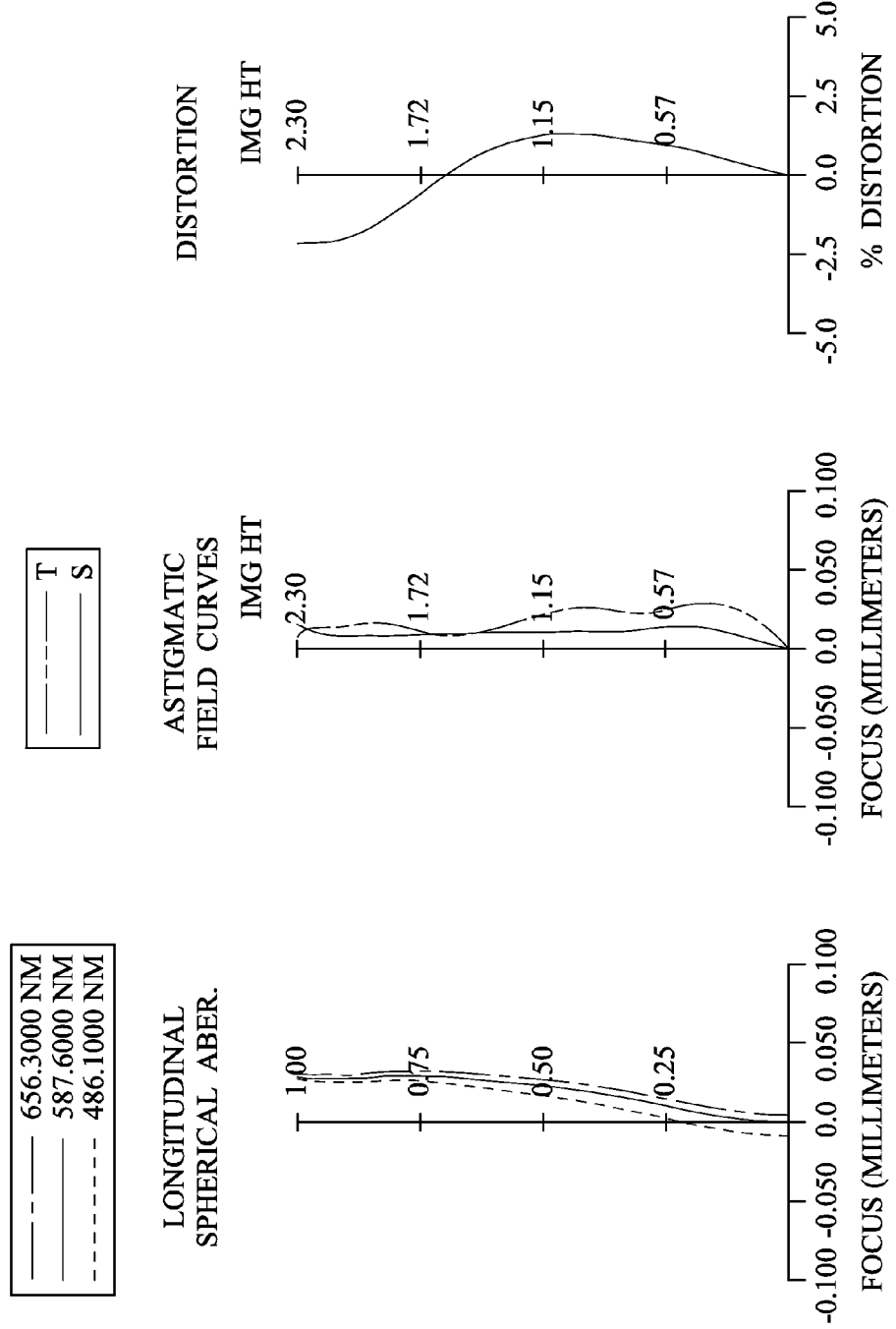
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows spherical aberration curves, astigmatic field curves and a distortion curve of the image capturing device according to the 10th embodiment. In FIG. 19, the image capturing device includes a photographing optical system (its reference numeral is omitted) and an image sensor 1080. The photographing optical system includes, in order from an object side to an image side, a first lens element 1010, an aperture stop 1000, a second lens element 1020, a third lens element 1030, a fourth lens element 1040, a fifth lens element 1050, an IR-cut filter 1060 and an image surface 1070, wherein the image sensor 1080 is disposed on the image surface 1070 of the photographing optical system. The photographing optical system has a total of five lens elements (1010-1050). There is an air space in a paraxial region between every two of the first lens element 1010, the second lens element 1020, the third lens element 1030, the fourth lens element 1040 and the fifth lens element 1050 that are adjacent to each other.

The first lens element 1010 with positive refractive power has an object-side surface 1011 being convex in a paraxial region thereof and an image-side surface 1012 being convex in a paraxial region thereof. The first lens element 1010 is made of a plastic material, and has the object-side surface 1011 and the image-side surface 1012 being both aspheric.

The second lens element 1020 with positive refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of a plastic material, and has the object-side surface 1031 and the image-side surface 1032 being both aspheric. Furthermore, the image-side surface 1032 of the third lens element 1030 includes at least one convex shape in an off-axial region thereof.

The fourth lens element 1040 with positive refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric. Furthermore, the image-side surface 1042 of the fourth lens element 1040 includes at least one concave shape in an off-axial region thereof.

The fifth lens element 1050 with negative refractive power has an object-side surface 1051 being convex in a paraxial region thereof and an image-side surface 1052 being concave in a paraxial region thereof. The fifth lens element 1050 is made of a plastic material, and has the object-side surface 1051 and the image-side surface 1052 being both aspheric. Furthermore, the image-side surface 1052 of the fifth lens element 1050 includes at least one convex shape in an off-axial region thereof.

The IR-cut filter 1060 is made of a glass material and located between the fifth lens element 1050 and the image surface 1070, and will not affect the focal length of the photographing optical system.

The detailed optical data of the 10th embodiment are shown in Table 19 and the aspheric surface data are shown in Table 20 below.

TABLE 19

10th Embodiment
f = 2.53 mm, Fno = 2.28, HFOV = 42.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.702 ASP | 0.226 | Plastic | 1.535 | 55.7 | 3.88 |
| 2 | | −8.712 ASP | 0.036 | | | | |

TABLE 19-continued

10th Embodiment
f = 2.53 mm, Fno = 2.28, HFOV = 42.7 deg.

| Surface # | | Curvature Radius | Thickness | | Material | Index | Abbe # | Focal Length |
|---|---|---|---|---|---|---|---|---|
| 3 | Ape. Stop | Plano | −0.002 | | | | | |
| 4 | Lens 2 | 3.703 | ASP | 0.299 | Plastic | 1.544 | 55.9 | 10.73 |
| 5 | | 9.843 | ASP | 0.253 | | | | |
| 6 | Lens 3 | −6.658 | ASP | 0.326 | Plastic | 1.639 | 23.5 | −3.37 |
| 7 | | 3.241 | ASP | 0.102 | | | | |
| 8 | Lens 4 | −29.205 | ASP | 0.842 | Plastic | 1.544 | 55.9 | 1.49 |
| 9 | | −0.799 | ASP | 0.236 | | | | |
| 10 | Lens 5 | 2.979 | ASP | 0.400 | Plastic | 1.535 | 55.7 | −1.88 |
| 11 | | 0.717 | ASP | 0.500 | | | | |
| 12 | IR-cut filter | Plano | | 0.300 | Glass | 1.517 | 64.2 | — |
| 13 | | Plano | | 0.232 | | | | |
| 14 | Image | Plano | | — | | | | |

Reference wavelength is 587.6 nm (d-line).

TABLE 20

Aspheric Coefficients

| Surface # | | | | | |
|---|---|---|---|---|---|
| | 1 | 2 | 4 | 5 | 6 |
| k = | −1.5598E+00 | −2.9054E+01 | −2.7132E+01 | −2.0857E+00 | 8.6490E+01 |
| A4 = | −1.6332E−01 | 1.2643E−01 | 3.5257E−01 | −2.8110E−01 | −7.5503E−01 |
| A6 = | −1.9545E−01 | −2.5714E−01 | 4.7330E−01 | 1.7185E−01 | 5.0337E−01 |
| A8 = | 1.2779E+00 | 7.6995E−01 | −3.9883E+00 | −4.2810E−01 | −1.9515E+00 |
| A10 = | −5.9416E+00 | −7.7306E+00 | 1.0187E+01 | −1.5627E+00 | 3.6949E+00 |
| A12 = | 1.2234E+01 | 2.5367E+01 | −7.8146E+00 | 6.4564E+00 | 1.4448E+00 |
| A14 = | −9.1520E+00 | −2.5747E+01 | | | |

| Surface # | | | | | |
|---|---|---|---|---|---|
| | 7 | 8 | 9 | 10 | 11 |
| k = | −9.0000E+01 | 4.3436E+01 | −3.8383E+00 | −8.9741E+01 | −4.3434E+00 |
| A4 = | −1.9527E−01 | −6.5482E−02 | −4.2909E−01 | −2.3630E−01 | −1.8723E−01 |
| A6 = | −1.3358E−01 | 2.3781E−01 | 6.5000E−01 | −6.3036E−02 | 1.1870E−01 |
| A8 = | 7.3580E−01 | −7.5313E−01 | −8.1866E−01 | 3.0673E−01 | −5.4235E−02 |
| A10 = | −7.5083E−01 | 1.9029E+00 | 7.5691E−01 | −3.0537E−01 | 1.4454E−02 |
| A12 = | 3.7600E−01 | −2.5733E+00 | −3.1679E−01 | 1.5557E−01 | −2.1523E−03 |
| A14 = | | 1.7204E+00 | 4.6666E−02 | −3.9689E−02 | 1.4397E−04 |
| A16 = | | −4.5496E−01 | | 3.9883E−03 | −1.2297E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 2.53 | Td/ΣCT | 1.30 |
| Fno | 2.28 | R3/f | 1.46 |
| HFOV [deg.] | 42.7 | (R7 + R8)/(R7 − R8) | 1.06 |
| (V2 + V3)/(V2 − V3) | 2.45 | f/R6 | 0.78 |
| CT2/CT1 | 1.32 | f2/R4 | 1.09 |
| CT2/T12 | 8.79 | f2/f1 | 2.77 |
| CT4/(CT1 + T12 + CT2) | 1.51 | | |

11th Embodiment

Figure 21:
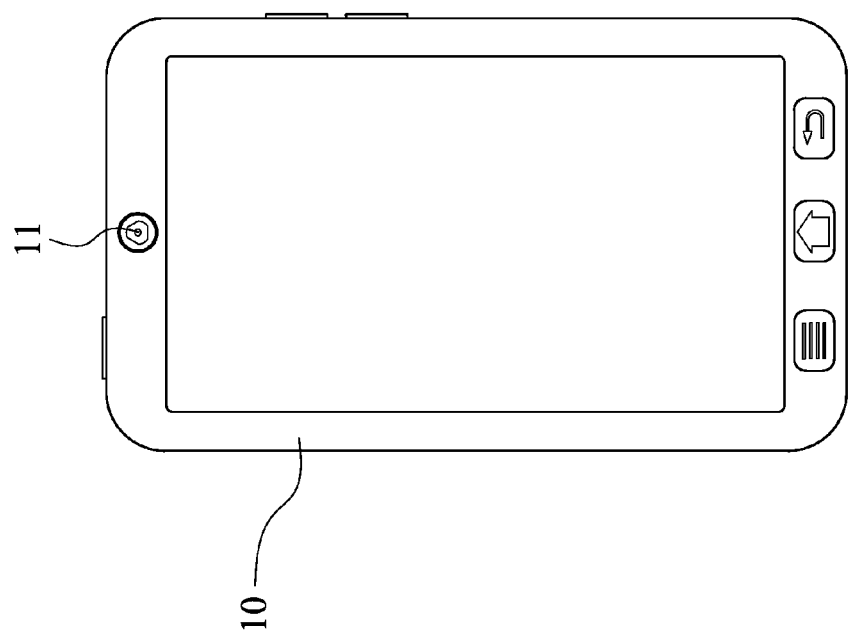
FIG. 21 is a schematic view of an electronic device according to the 11th embodiment of the present disclosure.

FIG. 21 is a schematic view of an electronic device 10 according to the 11th embodiment of the present disclosure. The electronic device 10 of the 11th embodiment is a smartphone, wherein the electronic device 10 includes an image capturing device 11. The image capturing device 11 includes a photographing optical system (its reference numeral is omitted) according to the present disclosure and an image sensor (its reference numeral is omitted), wherein the image sensor is disposed on an image surface of the photographing optical system.

12th Embodiment

Figure 22:
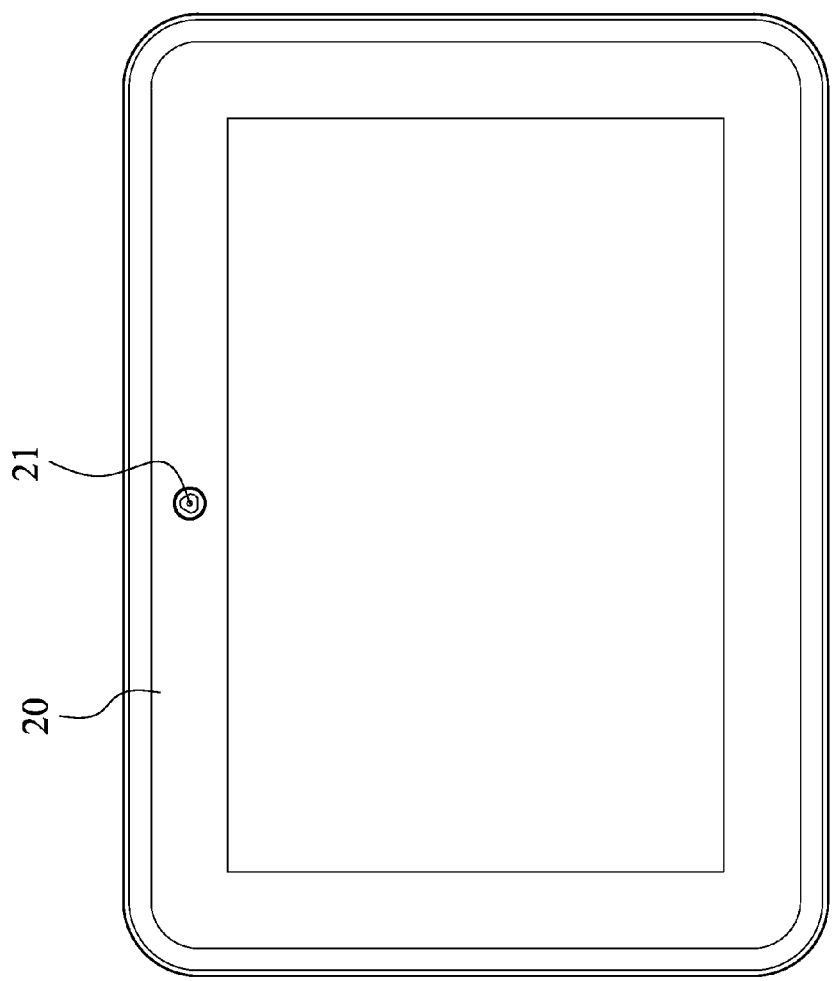
FIG. 22 is a schematic view of an electronic device according to the 12th embodiment of the present disclosure.

FIG. 22 is a schematic view of an electronic device 20 according to the 12th embodiment of the present disclosure. The electronic device 20 of the 12th embodiment is a tablet personal computer, wherein the electronic device 20 includes an image capturing device 21. The image capturing device 21 includes a photographing optical system (its

39 reference numeral is omitted) according to the present disclosure and an image sensor (its reference numeral is omitted), wherein the image sensor is disposed on an image surface of the photographing optical system.

13th Embodiment

Figure 23:
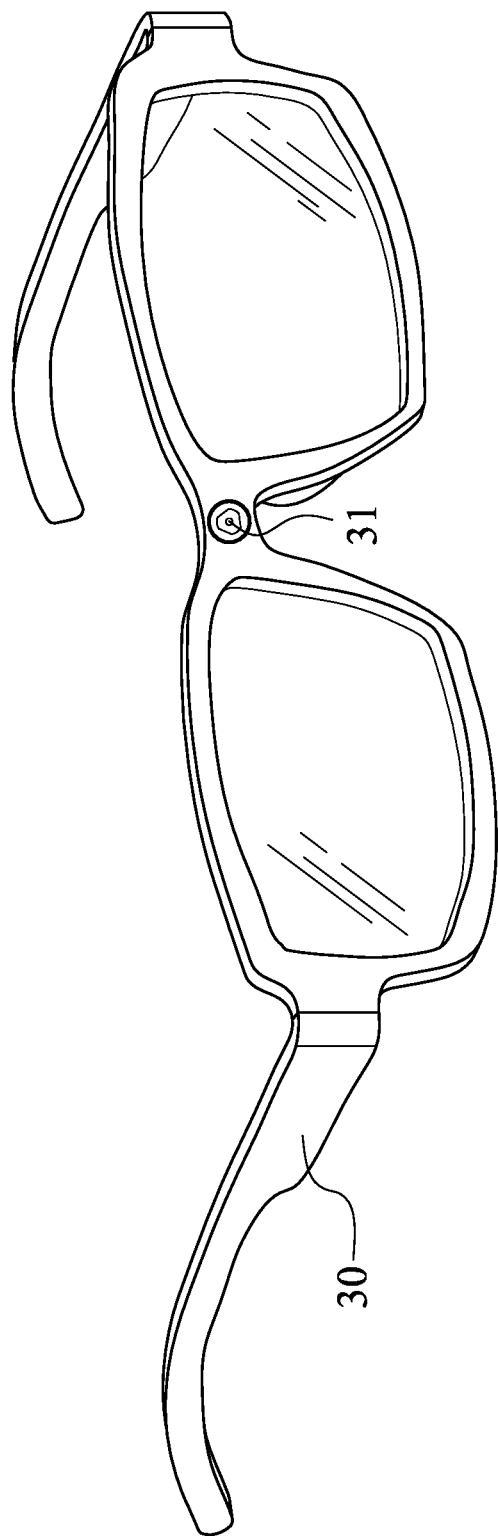
FIG. 23 is a schematic view of an electronic device according to the 13th embodiment of the present disclosure.

FIG. 23 is a schematic view of an electronic device 30 according to the 13th embodiment of the present disclosure. The electronic device 30 of the 13th embodiment is a wearable device, such as a head-mounted display (HMD), wherein the electronic device 30 includes an image capturing device 31. The image capturing device 31 includes a photographing optical system (its reference numeral is omitted) according to the present disclosure and an image sensor (its reference numeral is omitted), wherein the image sensor is disposed on an image surface of the photographing optical system.

The foregoing description, for purpose of explanation, has been described with reference to specific embodiments. It is to be noted that Tables 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical system comprising, in order from an object side to an image side:
    a first lens element with positive refractive power having a convex object-side surface;
    a second lens element with positive refractive power having a convex object-side surface and a concave image-side surface;
    a third lens element with negative refractive power having a concave image-side surface;
    a fourth lens element having positive refractive power; and
    a fifth lens element with negative refractive power having a concave image-side surface, wherein the image-side surface of the fifth lens element comprises at least one convex shape in an off-axial region thereon, and an object-side surface and the image-side surface of the fifth lens element are aspheric;
    wherein the photographing optical system has a total of five lens elements, there is an air space between every two lens elements of the first lens element, the second lens element, the third lens element, the fourth lens element and the fifth lens element that are adjacent to each other, a central thickness of the first lens element is CT1, a central thickness of the second lens element is CT2, a central thickness of the fourth lens element is CT4, an axial distance between the first lens element and the second lens element is T12, a focal length of the photographing optical system is f, a curvature radius of the image-side surface of the third lens element is R6, an Abbe number of the second lens element is V2, an Abbe number of the third lens element is V3, and the following conditions are satisfied:

$1.0 < CT4/(CT1+T12+CT2)$;

$0.55 < f/R6$; and $1.0 < (V2+V3)/(V2-V3) < 3.5$.

2. The photographing optical system of claim 1, wherein a focal length of the second lens element is f2, a curvature radius of the image-side surface of the second lens element is R4, and the following condition is satisfied:

$0.20 < f2/R4 < 10.0$.

3. The photographing optical system of claim 2, wherein the central thickness of the first lens element is CT1, the central thickness of the second lens element is CT2, the central thickness of the fourth lens element is CT4, the axial distance between the first lens element and the second lens element is T12, and the following condition is satisfied:

$1.25 < CT4/(CT1+T12+CT2) < 3.0$.

4. The photographing optical system of claim 2, wherein the focal length of the second lens element is f2, the curvature radius of the image-side surface of the second lens element is R4, and the following condition is satisfied:

$1.0 < f2/R4 < 5.0$.

5. The photographing optical system of claim 1, wherein the fourth lens element has a convex object-side surface and a convex image-side surface.

6. The photographing optical system of claim 1, wherein the fourth lens element has a convex image-side surface, and the image-side surface of the fourth lens element comprises at least one concave shape in an off-axial region thereof.

7. The photographing optical system of claim 1, wherein an axial distance between the object-side surface of the first lens element and the image-side surface of the fifth lens element is Td, a sum of central thicknesses of the first lens element, the second lens element, the third lens element, the fourth lens element and the fifth lens element is ΣCT, and the following condition is satisfied:

$1.10 < Td/\Sigma CT < 1.50$.

8. The photographing optical system of claim 1, wherein the central thickness of the first lens element is CT1, the central thickness of the second lens element is CT2, and the following condition is satisfied:

$1.0 < CT2/CT1 < 2.5$.

9. The photographing optical system of claim 1, wherein the focal length of the photographing optical system is f, the curvature radius of the image-side surface of the third lens element is R6, and the following condition is satisfied:

$0.55 < f/R6 < 1.25$.

10. The photographing optical system of claim 9, wherein the image-side surface of the third lens element comprises at least one convex shape in an off-axial region thereof.

11. The photographing optical system of claim 9, wherein a curvature radius of an object-side surface of the fourth lens element is R7, a curvature radius of an image-side surface of the fourth lens element is R8, and the following condition is satisfied:

$0.5 < (R7+R8)/(R7-R8) < 2.0$.

12. The photographing optical system of claim 1, wherein a focal length of the first lens element is f1, a focal length of the second lens element is f2, and the following condition is satisfied:

$1.25 < f2/f1 < 2.5$.

13. The photographing optical system of claim 1, wherein the first lens element has a convex image-side surface.

14. The photographing optical system of claim 1, wherein the central thickness of the second lens element is CT2, the axial distance between the first lens element and the second lens element is T12, and the following condition is satisfied:

$$1.5 < CT2/T12.$$

15. An image capturing device, comprising:
the photographing optical system of claim 1; and
an image sensor, wherein the image sensor is disposed on an image surface of the photographing optical system.

16. An electronic device, comprising:
the image capturing device of claim 15.

17. A photographing optical system comprising, in order from an object side to an image side:
- a first lens element with positive refractive power having a convex object-side surface and a convex image-side surface;
- a second lens element with positive refractive power having a convex object-side surface and a concave image-side surface;
- a third lens element having negative refractive power;
- a fourth lens element having a convex image-side surface; and
- a fifth lens element with negative refractive power having a concave image-side surface, wherein the image-side surface of the fifth lens element comprises at least one convex shape in an off-axial region thereon, and an object-side surface and the image-side surface of the fifth lens element are aspheric;
wherein the photographing optical system has a total of five lens elements, there is an air space between every two lens elements of the first lens element, the second lens element, the third lens element, the fourth lens element and the fifth lens element that are adjacent to each other, a focal length of the photographing optical system is f, a curvature radius of the object-side surface of the second lens element is R3, an Abbe number of the second lens element is V2, an Abbe number of the third lens element is V3, and the following conditions are satisfied:

$$0 < R3/f < 2.5; \text{ and}$$

$$1.0 < (V2+V3)/(V2-V3) < 3.5.$$

18. The photographing optical system of claim 17, wherein the fourth lens element has positive refractive power.

19. The photographing optical system of claim 18, wherein a central thickness of the first lens element is CT1, a central thickness of the second lens element is CT2, a central thickness of the fourth lens element is CT4, an axial distance between the first lens element and the second lens element is T12, and the following condition is satisfied:

$$0.80 < CT4/(CT1+T12+CT2).$$

20. The photographing optical system of claim 18, wherein the focal length of the photographing optical system is f, a curvature radius of an image-side surface of the third lens element is R6, and the following condition is satisfied:

$$0.55 < f/R6 < 1.25.$$

21. The photographing optical system of claim 17, wherein the image-side surface of the first lens element comprises at least one concave shape in an off-axial region thereof.

22. The photographing optical system of claim 17, wherein a central thickness of the first lens element is CT1, a central thickness of the second lens element is CT2, a central thickness of the fourth lens element is CT4, an axial distance between the first lens element and the second lens element is T12, and the following condition is satisfied:

$$1.25 < CT4/(CT1+T12+CT2) < 3.0.$$

23. The photographing optical system of claim 17, wherein the fourth lens element has a convex object-side surface.

24. The photographing optical system of claim 17, wherein a central thickness of the first lens element is CT1, a central thickness of the second lens element is CT2, and the following condition is satisfied:

$$1.0 < CT2/CT1 < 2.5.$$

25. The photographing optical system of claim 17, wherein a focal length of the first lens element is f1, a focal length of the second lens element is f2, and the following condition is satisfied:

$$1.25 < f2/f1 < 2.5.$$

26. An image capturing device, comprising:
the photographing optical system of claim 17; and
an image sensor, wherein the image sensor is disposed on an image surface of the photographing optical system.

27. An electronic device, comprising:
the image capturing device of claim 26.

* * * * *